(12) United States Patent
Priev

(10) Patent No.: US 11,580,857 B2
(45) Date of Patent: Feb. 14, 2023

(54) APPARATUS AND METHOD FOR SAFETY IMPROVEMENT BY COLLABORATIVE AUTONOMOUS VEHICLES

(71) Applicant: Intel Corporation, Santa Clara, CA (US)

(72) Inventor: Avi Priev, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 17/313,920

(22) Filed: May 6, 2021

(65) Prior Publication Data
US 2021/0312809 A1 Oct. 7, 2021

Related U.S. Application Data

(63) Continuation of application No. 16/518,392, filed on Jul. 22, 2019, now Pat. No. 11,004,338, which is a continuation of application No. 15/845,971, filed on Dec. 18, 2017, now Pat. No. 10,360,799.

(51) Int. Cl.
*G08G 1/16* (2006.01)
*G05D 1/02* (2020.01)
*G05D 1/00* (2006.01)

(52) U.S. Cl.
CPC .......... *G08G 1/162* (2013.01); *G05D 1/0061* (2013.01); *G05D 1/0214* (2013.01); *G05D 1/0285* (2013.01); *G05D 1/0295* (2013.01); *G08G 1/166* (2013.01); *G05D 2201/0213* (2013.01)

(58) Field of Classification Search
CPC .... G08G 1/162; G05D 1/0061; G05D 1/0214; G05D 1/0285; G05D 1/0295; G05D 2201/0213
See application file for complete search history.

(56) References Cited

U.S. PATENT DOCUMENTS

| | | | |
|---|---|---|---|
| 10,360,799 B2 | 7/2019 | Priev | |
| 10,870,437 B2 * | 12/2020 | Battles | B60W 60/0011 |
| 2014/0136414 A1 | 5/2014 | Abhyanker | |
| 2018/0224846 A1 * | 8/2018 | Kovacs | G08G 1/096783 |

OTHER PUBLICATIONS

O. Sawade, M. Schulze and I. Radusch, "Robust Communication for Cooperative Driving Maneuvers," in IEEE Intelligent Transportation Systems Magazine, vol. 10, No. 3, pp. 159-169, Fall 2018, doi: 10.1109/MITS.2018.2842241.*
Office Action dated Nov. 14, 2018 for U.S. Appl. No. 15/845,971, 8 pages.
Office Action dated Sep. 29, 2020 for U.S. Appl. No. 16/518,392, 13 pages.

* cited by examiner

*Primary Examiner* — Gertrude Arthur Jeanglaude
(74) *Attorney, Agent, or Firm* — Schwabe, Williamson & Wyatt, P.C.

(57) ABSTRACT

An apparatus for safety collaboration in computer-assisted or autonomous driving (CA/AD) vehicles includes an input interface to obtain sensor data from one or more sensors of a CA/AD vehicle, an output interface, and an analyzer coupled to the input and output interfaces to process the sensor data to identify an emergency condition of the CA/AD vehicle, and in response to the identified emergency condition, cause a communication interface of the CA/AD vehicle, via the output interface, to broadcast a request for assistance to be received by one or more nearby CA/AD vehicles. The apparatus may be disposed in the CA/AD vehicle.

34 Claims, 11 Drawing Sheets

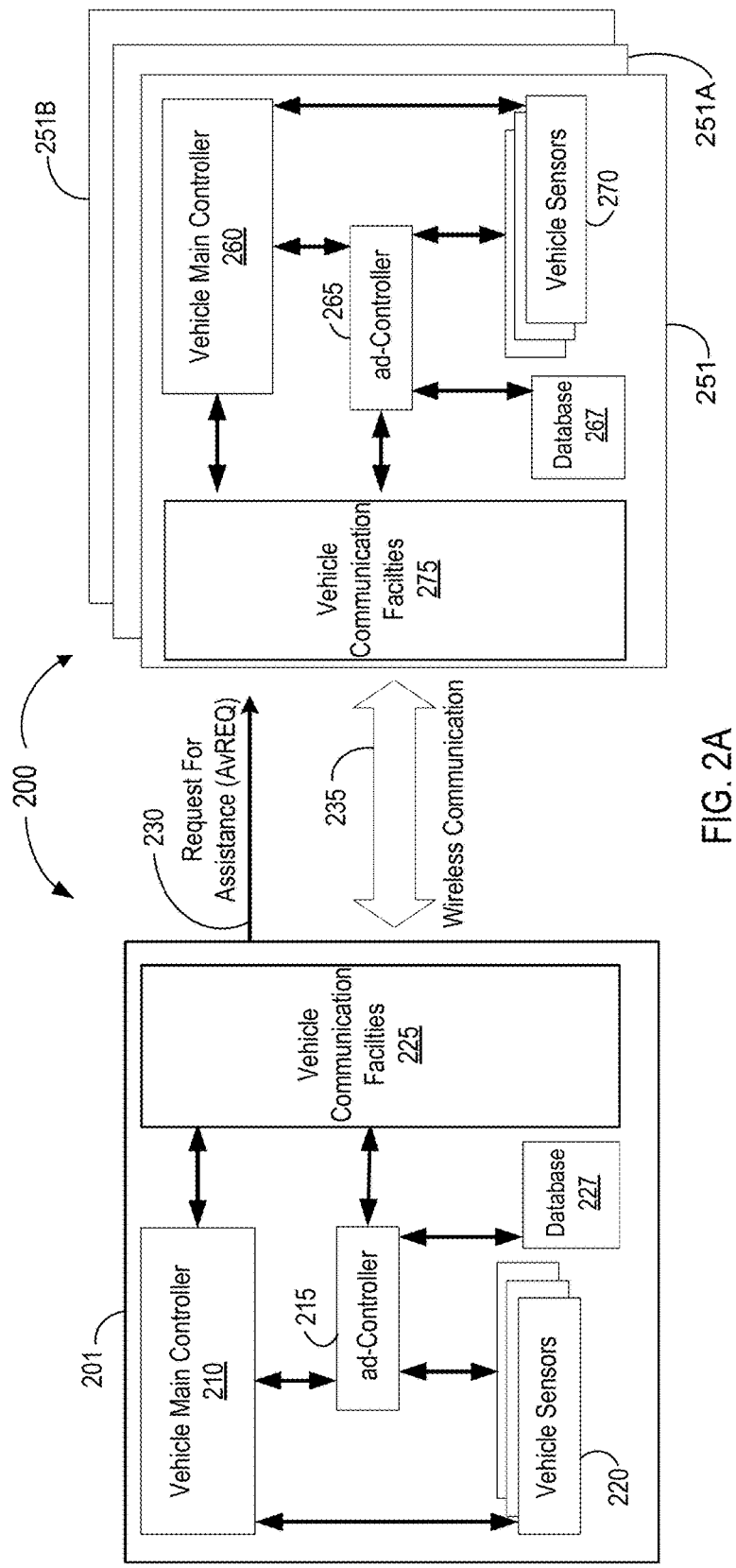
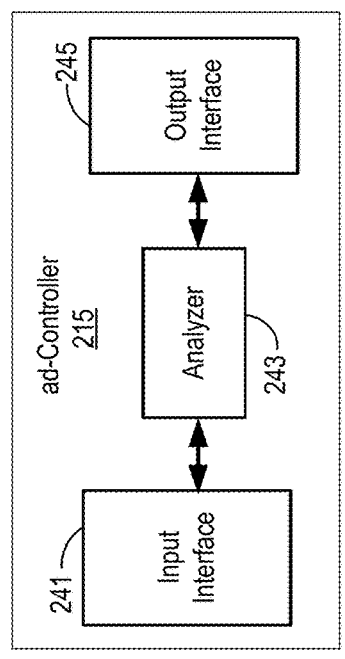
FIG. 2A
FIG. 2B

APPARATUS AND METHOD FOR SAFETY IMPROVEMENT BY COLLABORATIVE AUTONOMOUS VEHICLES

CROSS REFERENCE TO RELATED APPLICATIONS

The present application is a continuation of U.S. application Ser. No. 16/518,392 filed Jul. 22, 2019, which is a continuation of U.S. application Ser. No. 15/845,971 filed Dec. 18, 2017, now U.S. Pat. No. 10,360,799, the contents of each of which are hereby incorporated by reference in their entireties.

FIELD

Embodiments of the present disclosure relate to wireless communications and computer-assisted driving, and in particular to safety collaboration in autonomous or semi-autonomous vehicles.

BACKGROUND

Computer-assisted or autonomous driving (CA/AD) vehicles will likely become ubiquitous in coming years. It is hoped that CA/AD vehicles may enable better and much safer transportation than is now the norm. However, existing approaches to autonomous car safety are quite similar to legacy conceptual approaches (aka human controlled car). Generally, there is no essential safety advantages for people around and/or inside autonomous vehicles.

Furthermore, in case of an autonomous car "loss of control" or is hijacked remotely for making a terror attack/accidence, there isn't much can be done by other autonomous vehicles (beside regular police approaches).

BRIEF DESCRIPTION OF THE DRAWINGS

FIG. 2A illustrates a system to safety collaboration in autonomous or semi-autonomous vehicles, according to various embodiments.

FIG. 2B illustrates an expanded and detailed view of the ad-Controller of FIG. 2A, in accordance with various embodiments.

DETAILED DESCRIPTION

Figure 1A:
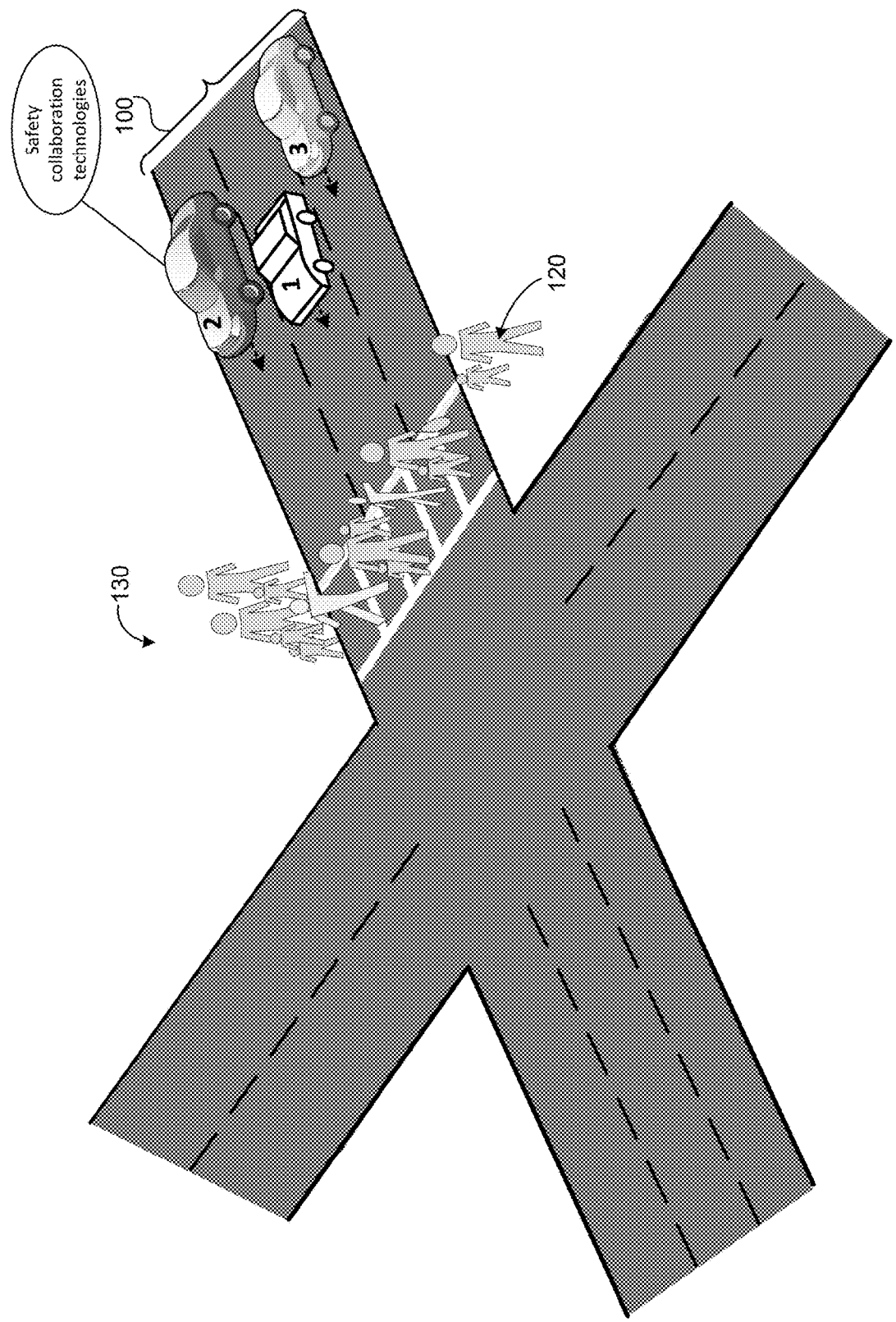
FIG. 1A depicts several CA/AD vehicles approaching an intersection according to various embodiments.

In embodiments, an apparatus for safety collaboration in autonomous or semi-autonomous vehicles may include an input interface to obtain sensor data from one or more sensors of a computer-assisted or autonomous driving (CA/AD) vehicle, an output interface, and an analyzer coupled to the input and output interfaces to process the sensor data to identify an emergency condition of the CA/AD vehicle, and in response to the identified emergency condition, cause a communication interface of the CA/AD vehicle, via the output interface, to broadcast a request for assistance to be received by one or more nearby CA/AD vehicles. In embodiments, the apparatus may be disposed in the CA/AD vehicle. As used herein, autonomous driving vehicles include, and may also be referred to as robots or drones (unmanned vehicles).

In embodiments, the input interface may further receive one or more responses to the request for assistance provided by other nearby vehicles, and the analyzer, in response to the one or more responses, may formulate an emergency response plan, and send the emergency response plan, via the output interface, to the other nearby vehicles that responded.

In embodiments, each of the one or more responses may include one or more of: size of the responding vehicle, mass of the responding vehicle, speed and location of the responding vehicle, any constraints on the ability of the responding vehicle to assist, passengers in the responding vehicle, or any special resources of the responding vehicle.

In embodiments, the input interface may further receive a confirmation signal from the one or more responding vehicles, and upon its receipt, the analyzer may monitor execution of the emergency response plan. Upon completion of the execution of the emergency response plan, in embodiments, the analyzer may further send a signal indicating that the emergency condition has been resolved, via the output interface, to the one or more responding vehicles.

In embodiments, the request for assistance includes at least one of an emergency type and a risk assessment, and the apparatus may include a distress controller having the input interface, the output interface and the analyzer. In embodiments, the apparatus may further include a main vehicle controller, coupled to the distress controller and to the one or more sensors of the CA/AD vehicle, and the distress controller may obtain the sensor data in an alarm signal received from the main vehicle controller.

In embodiments, the apparatus may further include the one or more sensors of the CA/AD vehicle, which may include one or more of a speed sensor, a brake failure sensor, a flat tire sensor, a tire blowout sensor, a collision sensor or a steering failure sensor.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/ or any other like term denoting a pathway or medium through which data is communicated.

As used hereinafter, including the claims, the terms "module", "user interface", "vehicle main controller", "ad-Controller", "vehicle sensor", and/or "vehicle communications facilities", may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

As used herein, the term semi-autonomous driving is synonymous with computer-assisted driving. The term does not mean exactly 50% of the driving functions are automated. The percentage of automated driving functions may vary between 0% and 100%. In addition, it will be appreciated the hardware, circuitry and/or software implementing the semi-autonomous driving may temporarily provide no automation, or 100% automation, such as in response to an emergency situation. For ease of illustration, the following non-limiting example use cases for mobile devices and autonomous vehicles are relevant to, and addressed by, various embodiments of the invention.

In embodiments, methods of collaboration between CA/AD vehicles in case of an emergency condition experienced by one or more of them may be implemented to enable safety capabilities that are not achievable by any individual CA/AD vehicle acting alone. In embodiments, safety capabilities may, for example, completely prevent unrecoverable damage to people and assets, or, for example, may achieve a significant reduction in damage to humans. In embodiments, this collaboration between multiple CA/AD vehicles allows for safety measures to be taken that no single vehicle, acting alone, could perform. Thus, in embodiments, a better safety result may be obtained due to a large number of vehicles whose assistance and resources may be brought to bear to any emergency situation.

FIGS. 1A through 1D illustrate an example according to various embodiments to more easily understand the detailed descriptions that follow. With reference to FIG. 1A there are three CA/AD vehicles 100 shown, labeled 1, 2 and 3, each incorporated with the safety collaboration technologies of the present disclosure, as shown in the bubble connected to vehicle 2 in each of FIGS. 1A through 1C (understood to also be the case for each of vehicles 1 and 3, not shown so as not to clutter the figures), and as shown in the bubble connected to vehicle 1 in FIG. 1D (understood to also be the case for each of vehicles 1 and 2 in the figure, only not shown so as not to clutter the figure). Each of vehicles 1 2 and 3 have an arrow showing their respective direction of travel. There is also shown a crosswalk at the beginning of an intersection, with adults and children 120 crossing the crosswalk, and adults and children 130 standing on the other side of the crosswalk, having already crossed. For the purpose of describing the safety coloration technologies, vehicle 1, in the center lane, will develop a problem. This is described with reference to FIG. 1B.

Figure 1B:
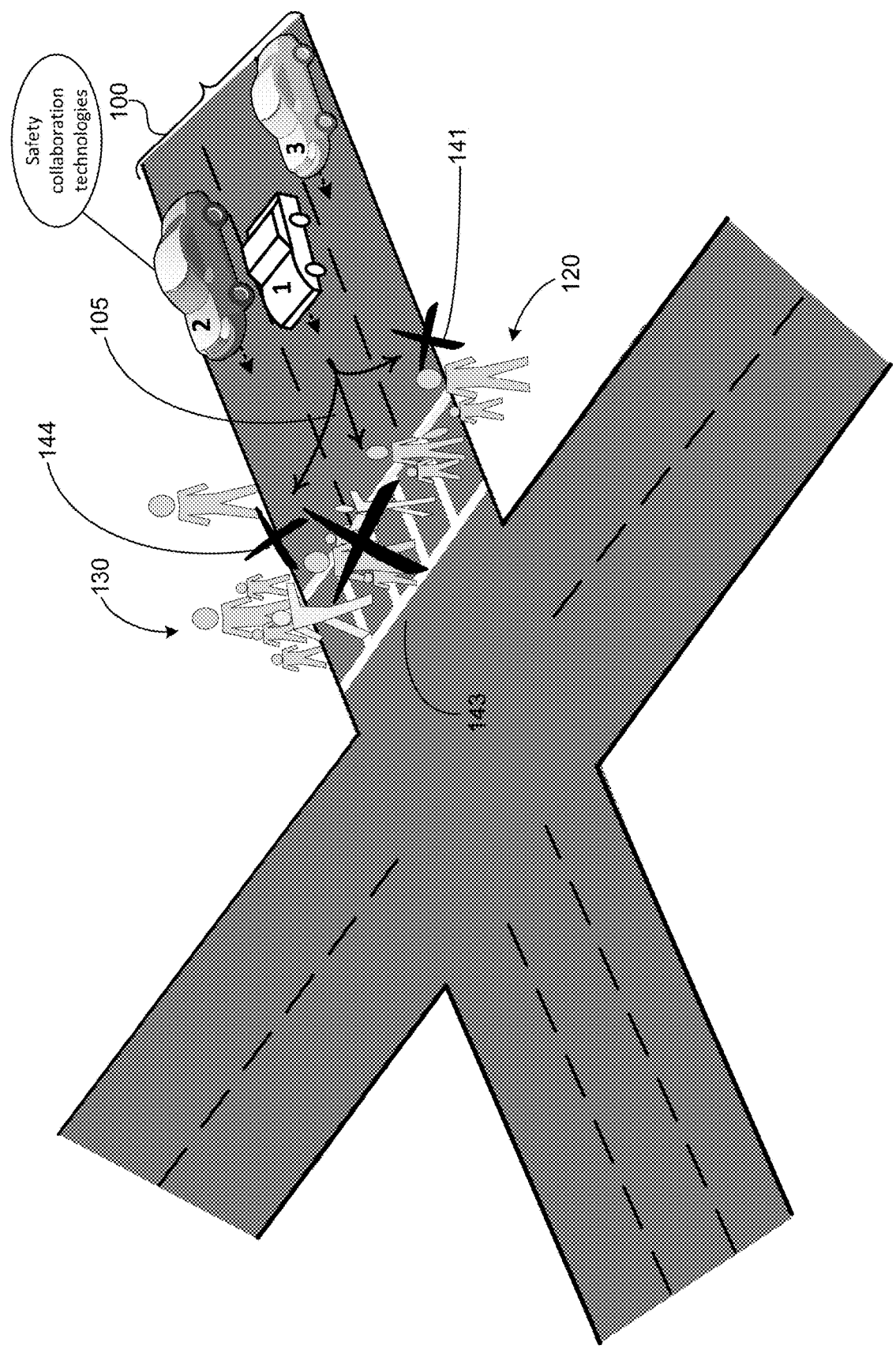
FIG. 1B depicts the several CA/AD vehicles of FIG. 1A, where the middle vehicle (Vehicle 1) has lost braking capability and, if this condition is unaddressed, will collide with pedestrians.

With reference to FIG. 1B, it is assumed that vehicle 1 has lost its brakes as well as control of its steering. At its current speed, it will collide with crossing adults and children 120 at either point of impact 141 or 143, or with the adults and children who have already crossed at point of impact 144. In embodiments, upon detecting that it has an emergency condition, vehicle 1, incorporated with the safety collaboration technologies of the present disclosure, may send out a request for assistance to neighboring vehicles, in this case vehicles 2 and 3, similarly incorporated with the safety collaboration technologies of the present disclosure, would receive the request for assistance, and respond to it. In embodiments, the response may include the position of the responding vehicle relative to the position of vehicle 1, and also a proposal from each responding vehicle as to what it can do to help. In embodiments, the response may be a direct reply to the vehicle requesting assistance. In other embodiments, the responses may be broadcast, such that each proposal is known to the other vehicles in the vicinity.

These proposals may include, for example, executing a block, or executing a jump from a side of vehicle 1, or the like. Alternatively, each of the responding vehicles may include their positions, speeds and resources, and wait for logic provided in vehicle 1 to analyze all received neighboring vehicle responses, and craft a proposed response to the emergency condition.

Figure 1C:
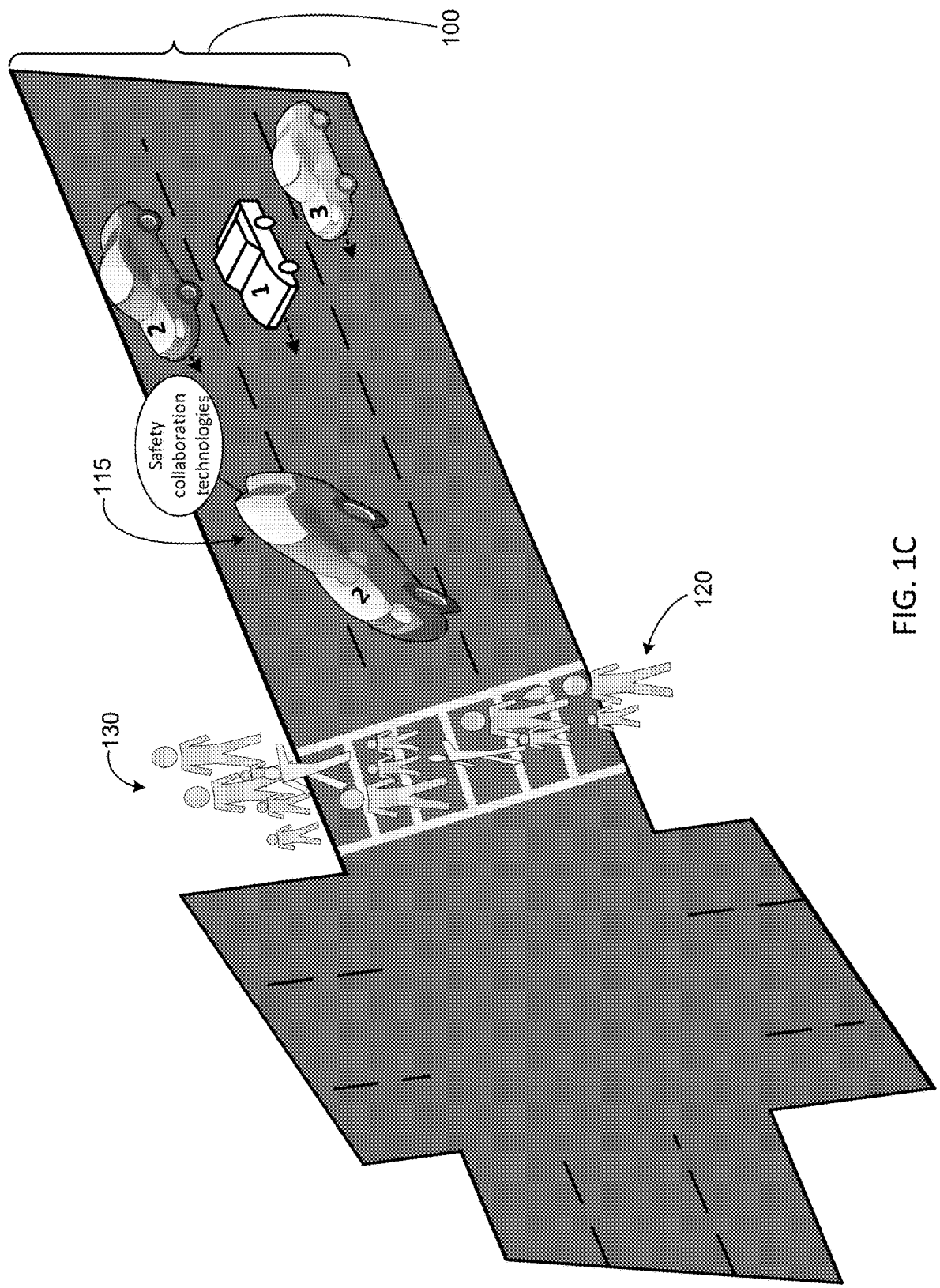
FIG. 1C depicts the several CA/AD vehicles of FIG. 1B, where one of the neighboring vehicles (Vehicle 2), to remedy the loss of braking capability of Vehicle 1, performs a blocking maneuver approaching an intersection according to various embodiments.

FIG. 1C illustrates what may be known as a direct block. In this maneuver, one of the neighboring vehicles, here vehicle 2, intentionally gets in the way of the vehicle having the emergency, in this example loss of braking and steering, and absorbs the impact of vehicle 1 crashing into it. The block prevents vehicle 1 from running into any of the pedestrians at any of impact points 141, 143 and 144, as illustrated in FIG. 1B. Depending on current speeds, remaining distance to the pedestrian walkway, and other factors, a "direct block" response may cause considerable damage to the blocking vehicle, as well as collateral damages to some of the neighboring vehicles. Thus, in embodiments, not all neighboring vehicles may consent to such a response, and in such cases a responding vehicle may include in its response to the request for assistance sent by vehicle 1 with a statement that "cannot perform direct block" or one of similar effect.

It is here noted that public service CA/AD vehicles, or those otherwise operated by governments or semi-governmental agencies, e.g. certain charities, volunteer groups, non-profit organizations, may, in embodiments, be empowered to perform any type of life-saving response, including those that result in significant damage to the responding vehicle. Or, in alternate embodiments, in a context in which many vehicles on the roads are CA/AD, insurance companies may, realizing the value at the macro level of safety collaboration according to various embodiments, may authorize any vehicle which they insure to perform any such life-saving maneuver, realizing that the overall effect of saving lives at the expense of physical damage to one or more vehicles results in lower claims paid overall.

Figure 1D:
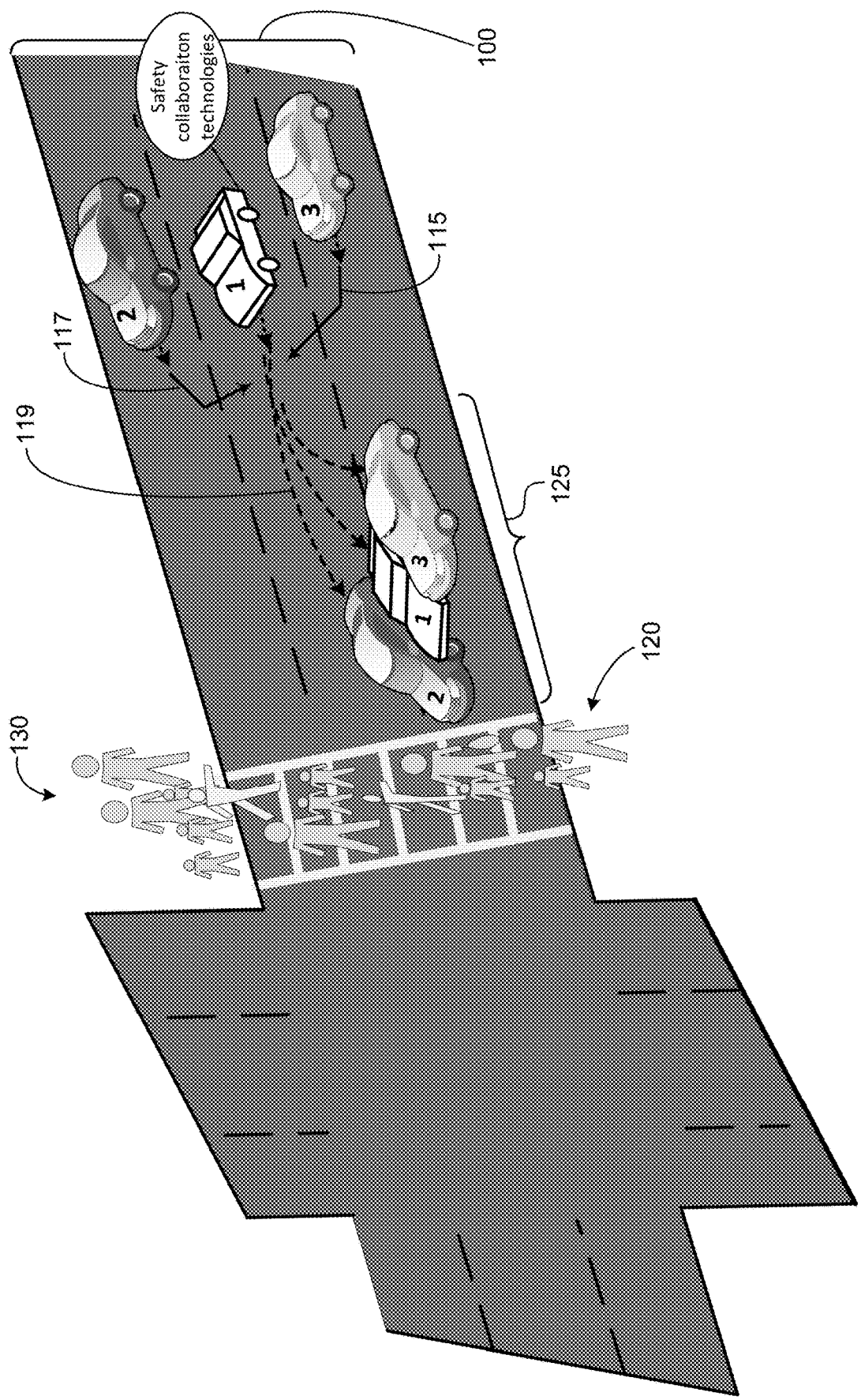
FIG. 1D depicts the several CA/AD vehicles of FIG. 1B, where both of the neighboring vehicles (Vehicles 2 and 3), to remedy the loss of braking capability of Vehicle 1, perform a controlled stop maneuver according to various embodiments.

FIG. 1D illustrates an alternate maneuver to the direct block of FIG. 1C. With reference to FIG. 1D, in embodiments, in response to receiving and analyzing results from vehicles 2 and 3, vehicle 1 may select that a "side jump" be performed. This safety maneuver involves multiple responding vehicles, with detailed co-ordination between them, but involves significantly less property damage to the vehicles involved. Essentially, it is a controlled deceleration of the vehicle that has lost of braking or steering (e.g., vehicle 1) to a safe stopping point.

In embodiments, with reference to FIG. 1D, the side jump maneuver may proceed as follows. Vehicle 2 synchronizes its speed with that of vehicle 1, and begins to push slightly against the right side of vehicle 1, following trajectory 117 in FIG. 1D. In embodiments, the angle of contact between vehicles 2 and 1 may be minimal, such as, for example, 10%. Similarly, and at the same time, vehicle 3 synchronizes its speed with that of vehicle 1, and also begins to push slightly against the left side of vehicle 1, following trajectory 115. Because the chosen safe stopping point is at area 125 in FIG. 1D, which is to the left of the original center lane in which vehicle 1 was travelling, in embodiments, the push of responding vehicle 2 against vehicle 1 needs to be a bit larger. Thus, in embodiments, the angle of contact between vehicles 3 and 1 may be even less than that between vehicles 2 and 1, such as, for example, 5%. In embodiments, both "pushing to side" vehicles (e.g., vehicles 2 and 3) coordinate the speed, direction of wheels and the angle of contact against vehicle 1 in a manner calculated by vehicle 1 as the best route to prevent it from crashing into multiple pedestrians, as shown in FIG. 1B. Once contact has been made, vehicles 2 and 3 may themselves decelerate, as well as cause vehicle 1 to do so. Moreover, vehicle 2 or 3 may ask vehicle 1 to shut its engine down completely, to reduce further acceleration forces. In such manner, all three vehicles may manage to stop before reaching the pedestrian walkway.

In embodiments, there may be several additional messages between the three vehicles than were described above. For example, there may be several messages exchanged between all three participating vehicles to synchronize their engine power, wheel direction and braking systems (the latter only in the case of vehicles 2 and 3, where, as in this example, vehicle 1 has lost all braking). In embodiments, the additional messages may be such as are needed to execute a given safety resolution maneuver.

FIG. 2A illustrates an example system 200 according to various embodiments. With reference thereto, there are shown two example apparatuses, 201 and 251. In the example of FIG. 2, apparatus 201 may be disposed in a CA/AD vehicle with an emergency condition, such as, for example, vehicle 1 of FIGS. 1A through 1D, and apparatus 251 may be disposed in a neighboring CA/AD vehicle, such as, for example, vehicles 2 or 3 of FIGS. 1A through 1D. To illustrate that apparatus 251 may be disposed in neighboring CA/AD vehicles, several of them are shown in FIG. 2A, including 251A and 251B.

With reference to FIG. 2A, apparatus 201 may include a vehicle main controller 210, an ad-Controller 215, vehicle sensors 220 and vehicle communications facilities 225. In embodiments, vehicle main controller 210 may be a main controller for the entire CA/AD vehicle, and may be communicatively coupled to each of ad-Controller 215, vehicle sensors 220 and vehicle communications facilities 225, as shown by the two way arrows connecting these elements in FIG. 2A. In embodiments, vehicle sensors 220 may include one or more of a speed sensor, a brake failure sensor, a flat tire sensor, a tire blowout sensor, a collision sensor, a steering failure sensor, or the like. It is noted that ad-Controller 215 may, in embodiments, obtain sensor data directly from vehicle sensors 220 and process the sensor data to identify an emergency condition. Alternatively, in other embodiments, ad-Controller 215 may receive the sensor data from vehicle main controller 210, following processing of the sensor data by vehicle main controller 210. In the latter case, vehicle main controller 210 may, in embodiments, poll one or more sensors of vehicle sensors 220 at either pre-defined intervals or continuously, generate an alarm signal in response to pre-defined sensor values, and send the alarm signal (including the underlying sensor data) to ad-Controller 215. In the former case, ad-Controller 215 may in embodiments, poll one or more sensors of vehicle sensors 220 at either pre-defined intervals or continuously.

As shown in FIG. 2A, ad-Controller 215 may be communicatively coupled to vehicle communications facilities 225. In embodiments, once ad-Controller 215 has identified an emergency condition that requires external assistance, it may, via vehicle communications facilities 225, broadcast a request for assistance 230 to neighboring CA/AD vehicles. In embodiments, this request may be broadcast in a way that any neighboring CA/AD vehicle may receive it. Thus, for example, the request for assistance may be sent via wireless communications 235, such as, for example, cellular (3G/4G/5G), Bluetooth (BT/BLE), WiFi, Infrared (IR), vehicle-to-vehicle (V2V) communications, or other communications links. In embodiments, ad-Controller 215 may be communicatively coupled to a database 227, which may contain prioritized entries of possible single primary failure/damage causes, and a ranked representation of those causes. Data or records from database 227 may, in embodiments, used as normalized inputs for decision making by ad-Controller 215, and in particular, analyzer 243 of ad-Controller 215, described below in connection with FIG. 2B. In embodiments, in the request for assistance, ad-Controller 215 may explicitly describe the type of emergency it is involved in, e.g., loss of brakes, as well as its position, velocity and mass. In embodiments, the request for assistance may include ad-Controller's 215 risk assessment of the situation, such as, for example, possible consequences of directly crashing into pedestrians crossing at a nearby intersection (e.g., impact point 143 in FIG. 1B), or alternatively, crashing into a side of a street with less pedestrians (e.g., impact points 144 and 141 in FIG. 1B).

FIG. 2B illustrates internal details of ad-Controller 215. With reference thereto, ad-Controller 215 may include an input interface 241 to obtain sensor data from one or more of vehicle sensors 220 or vehicle main controller 210, as the case may be, as described above. Ad-Controller 215 may further include an output interface 245, which may, for example, be communicatively connected to vehicle communication facilities 225, and an analyzer 243, coupled to each of input interface 241 and output interface 245, to process the sensor data to identify an emergency condition of the CA/AD vehicle. In embodiments, analyzer 243 may include timer 247. Timer 247 may be used to limit a response window from a responding vehicle, for example. When used by an ad-Controller provided in a responding vehicle, such as ad-Controller 265, provided in apparatus 251, for example, upon receipt of an incoming request for assistance 230, ad-Controller 265 may set timer 247 to set an absolute time in which the responding vehicle may return to normal operation, as described below in connection with FIG. 4. In embodiments, in response to the identified emergency condition, analyzer 243 may cause vehicle communication facilities 225 of the CA/AD vehicle, via output interface 245, to broadcast a request for assistance 230 to be received by one or more nearby CA/AD vehicles.

It is noted that, in some embodiments, the functions of ad-Controller 215 may be divided into two logical elements, namely an "ad-Controller" that is responsible for logic/heuristics of making judgement/decisions, and an "ad-Actuator" to "implement the decision made by the ad-Controller" through available facilities. In other words, in such embodiments, the ad-Controller may define "what" and the ad-Actuator may define "how."

Returning now to FIG. 2A, in embodiments, ad-Controller 215, upon sending the request for assistance 230 and receiving responses to the request from neighboring CA/AD vehicles, may process all available collective resources and decide upon a response to resolve the emergency condition.

It is noted that, in embodiments, apparatus 251 may be identical to apparatus 201, and may thus have identical elements, including vehicle main controller 260, ad-Controller 265, vehicle sensors 270 and vehicle communications facilities 275, which may function as described above for their counterparts in apparatus 201. In embodiments, apparatus 251 may thus function in the same way as apparatus 201 described above, when the vehicle in which it is disposed encounters an emergency situation. Thus, every CA/AD vehicle may be provided with a single apparatus, which may function as either an initiator of, or a responder to, a request for assistance. However, in the example of FIG.

2A, apparatus 251 is disposed in a responding vehicle, such as, for example, vehicle 2 or vehicle 3 in FIGS. 1A through 1D, and thus operates in a responder mode. Thus, in embodiments, upon receiving request for assistance 230 from apparatus 201 via vehicle communication facilities 275, ad-Controller 265 of apparatus 251 may analyze the request, and may, using analyzer 243, determine and formulate a response, and then send the response, via vehicle communication facilities 275, over wireless communications link 235, to apparatus 201.

In embodiments, the responses from neighboring vehicles to request for assistance 230 may include, for example, the size of the responding vehicle, the mass of the responding vehicle, the speed and location of the responding vehicle, any constraints on the ability of the responding vehicle to assist the vehicle having the emergency, passengers in the responding vehicle, or any special resources of the responding vehicle. Thus, in embodiments, ad-Controller 265 of a responding vehicle, in formulating a response to the request for assistance 230, may obtain data from one or more of vehicle sensors 270 and vehicle main controller 260 prior to formulating its response. In alternate embodiments, where ad-Controller 265 of a responding vehicle has sufficient data to clearly understand the impending consequences of the emergency situation if left unresolved, ad-Controller 265 may include in its response a proposed response maneuver, such as, for example, the blocking maneuver of FIG. 1C or the controlled stopping maneuver of FIG. 1D.

Continuing with reference to FIG. 2A, upon receiving responses from several neighboring CA/AD vehicles, in embodiments, ad-Controller 215 of apparatus 201 may analyze all of the responses, and, as soon as it can determine a course of action, may notify all of the responding vehicles as to that course of action. Following receipt of a confirmation message by each of the responding vehicles that one or more of them can execute the safety response determined by ad-Controller 215, the collaborative safety response may begin.

It is noted that, in embodiments, for all messaging between CA/AD vehicles, an explicit naming convention between all participating vehicles may be utilized to avoid misunderstanding. In embodiments, this may be implemented in a unique ID to be used by all communications between involved vehicles.

It is further noted that while the examples of FIGS. 1A through 1D, and FIGS. 2A and 2B describe other CA/AD vehicles as acting as responders, in alternate embodiments the pool of responders may be expanded. This may occur, for example, in a smart city/environment, which may have many other "intelligent" facilities, such as smart mobile kiosks, mobile advertising stands, etc. Thus, in such alternate embodiments, the safety of all may be benefitted as the number and type of responders may proliferate.

In embodiments, ad-Controller 215 may be implemented in hardware, e.g., application specific integrated circuit (ASIC), or programmable circuits, such as, Field Programmable Gate Arrays (FPGA), or in hardware/software combination with a processor and memory arrangement having instructions that in response to execution of the instruction, cause the ad-controller 215 to perform the operations described. In embodiments, ad-Controller 215 and vehicle main controller 210 may be part of an on board system or in-vehicle system of the CA/AD vehicle.

Figure 3:
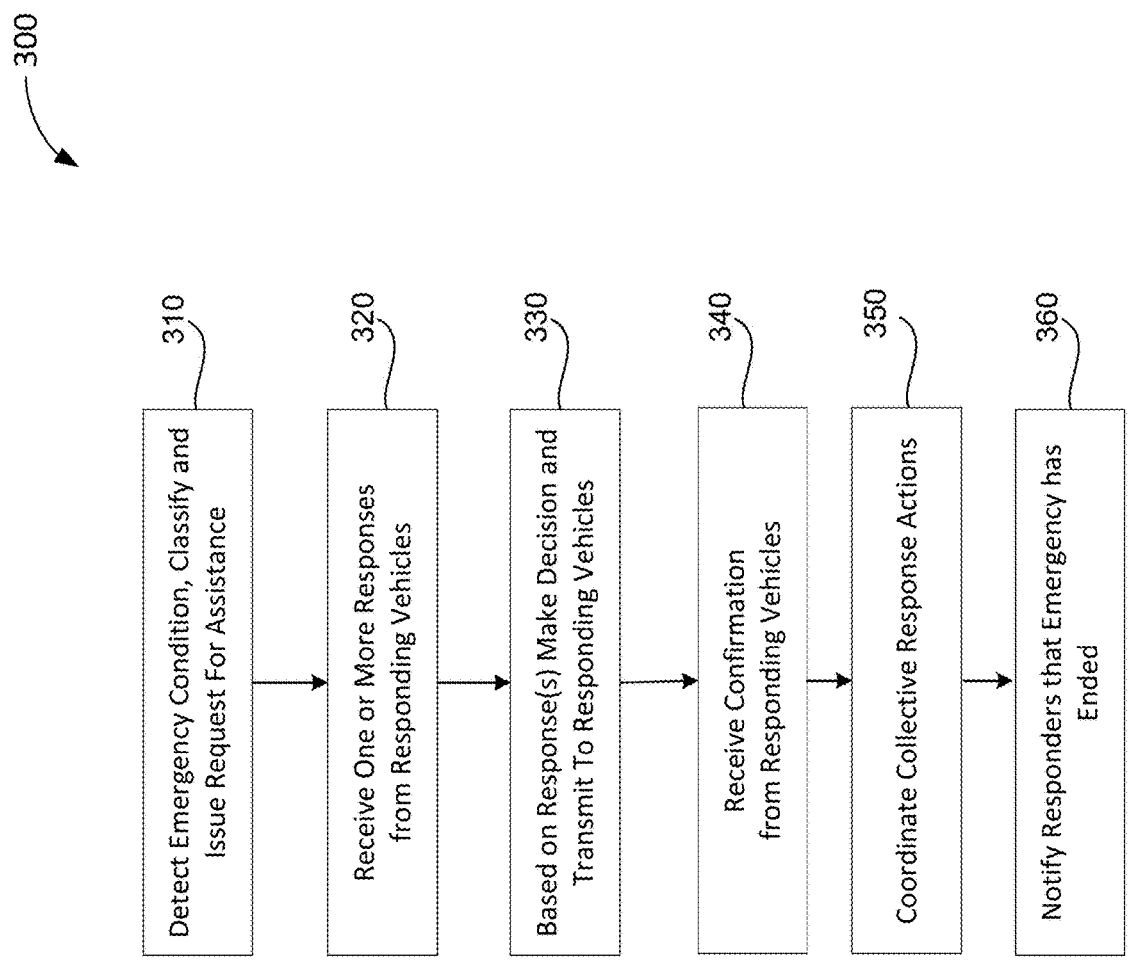
FIG. 3 illustrates an overview of the operational flow of a process for detecting an emergency condition in an CA/AD vehicle and managing a response to it, in accordance with various embodiments.

With reference to FIG. 3, an overview of the operational flow of a process for detecting an emergency condition in a CA/AD vehicle, and managing a response to it, in accordance with various embodiments, is presented. Process 300 may be performed by apparatus such as apparatus 201 according to various embodiments. Process 300 may include blocks 310 through 350. In alternate embodiments, process 300 may have more or less operations, and some of the operations may be performed in different order.

Process 300 may begin at block 310, where an example apparatus may detect an emergency condition, classify it, and issue a request for assistance. As noted above, in embodiments, the detection of an emergency condition in a vehicle may occur upon a change in vehicle sensor values directly identified by an ad-Controller, or, for example, upon receipt of an alarm signal from a vehicle main controller that may poll or receive sensor data and identify patterns indicating an emergency condition. In embodiments, the request for assistance may include a commonly recognizable standard signal broadcast by autonomous vehicles upon detecting an emergency condition. In embodiments, such a standard may be known as an Autonomous Vehicle Request For Assistance, or "AvREQ."

In embodiments, an AvREQ may be transmitted over multiple physical protocols such as, for example, cellular (3G/4G/5G), BT/BLE, WiFi, IR, etc. as may be available in CA/AD vehicles. In embodiments, the AvREQ may include information needed for efficiently exchanging critical information to deciding upon a plan of action. In embodiments, an AvREQ message may include, for example, a standard publicly recognizable label, such as a 0x0911 word size well known header. The message may further include a Source ID, which may be a unique ID that facilitates event source identification. For example, a Source ID may include a pseudorandom identifier (Su-ID) that may be generated by a vehicle based on the vehicle vendor ID, GPS/location selected input, and/or additional predefined sources such as a cellular base station ID (BSID), a current distance from the base station, or the like, that together insure confidentiality as to which vehicle is signaling, yet provide a temporary unique identity at the same time.

In embodiments, an AvREQ may further include an AvREQ type, which may be, for example, a four byte field with predefined values. In embodiments, the AvREQ type may identify the most critical issue experienced by the vehicle needing assistance, akin to a "primary diagnosis." In one example, these values may include, in decreasing levels of severity:

0001— engine fire;
0002— loss of brakes;
0003— loss of steering;
0004—hijacked or unauthorized car control;
0005—dangerous fuel leakage/battery flammable alarm;
0006— loss of sensors critical to guidance;
. . .
0009— lack of fuel/energy;
0010— unstable air pressure in tires; etc.

In embodiments, an AvREQ may further include a location, provided in, for example, GPS/A-GPS, coordinates, and, for example, a four word field encoding location metrics, such as, for example, Latitude/Longitude values of Portland, Oreg., US: 45.52306220000001; −122.67648150000002. In embodiments, an AvREQ may also include speed and direction of the vehicle, as well as parameters of the current trajectory, and any possible or considered routes. An AvREQ may also include a time stamp to identify when it was initially sent out. Finally, an AvREQ may include a brief description of the assistance needed. In embodiments, this may be a field allowing for short phrases such as "need to stop me", "ask to block me", "help save passengers' lives", "help avoid pedestrians at impact point", or the like. In embodiments, an AvREQ may further include additional informational fields as may be appropriate.

Continuing with reference to FIG. 3, block 310, in embodiments, the classification of risk inherent in an emergency condition may, for example, be based on a predefined set of known possible malfunction or accident situations. In embodiments, a database with prioritized entries of possible single primary failure/damage causes, and a ranked representation of those causes, such as, for example, database 227 in apparatus 201 of FIG. 2A, or database 267 of apparatus 251 of FIG. 2A, may be maintained in the CA/AD vehicle and used as a normalized input for decision making at block 310. Thus, for example, if a vehicle senses an indication of fire in its fuel system, such as by receiving a report from a sensor in or near its fuel tank that measures temperature and pressure, that situation may be ranked as a 5 point condition. Then, in the absence of other sensor inputs, an ad-Controller may take this input (5 point condition) and scan for other inputs, such as the existence of flammable objects in proximity to the vehicle. In embodiments, based on the accumulated data, a vehicle may decide that the current risk is at, for example, 5 points, a medium level of risk. That can be translated into actions, such as, for example, an AvREQ that includes a message such as "all nearby vehicles: maintain a distance and avoid approaching; at a medium emergency level regarding a possible fire."

Or, in another example, a vehicle may experience a brake failure while travelling downhill. In this case, its ad-Controller may receive input from a braking control system regarding the failure, and may estimate it at, for example, "10 points." In addition, it may obtain further data from the engine, to the effect that given a high acceleration the engine cannot be used to slow down the vehicle (e.g., by downshifting). Given both of these sets of data, the ad-Controller may make a final risk assessment of "high level", and its AvREQ will include that assessment of risk. In addition, with the risk assessment, the ad-Controller may suggest options for the requested assistance. For example, "vehicles receiving this communication needed to mechanically stop me." In embodiments, a mechanically stop may include any of: "block me from a front side to reduce my velocity downhill", "help push me to a safe side of the hill to stop my car by mechanical friction with the side of the road", or the like.

It is noted that as regards classification of an emergency, for example, a scale of five major levels may be defined, such as "possible emergency", "emergency—low risk", "emergency—medium risk", "emergency—high risk" and "critical condition."

Continuing with reference to FIG. 3, from block 310, process 300 may proceed to block 320, where the vehicle experiencing the emergency condition may receive one or more responses from various neighboring vehicles. In embodiments, responding vehicles may receive the request for assistance, and respond to it, via apparatuses 251, 251A and/or 251B of FIG. 2A. From block 320, process 300 may proceed to block 330, where the vehicle experiencing the emergency condition, based upon the responses received at block 320, may make a decision as to a course of action, and transmit the course of action to the responding vehicles.

It is here noted that the responses received at block 320 may include suggestions for remedial action. If that is the case, then the ad-controller may select the most optimized/best proposal received. Continuing the previous example of loss of brakes, there may be two responders. A first may have no passengers, but may be a lightweight vehicle; another responder may be a truck, say 5 times heavier and 10 times more powerful than the vehicle in the emergency, with one passenger. In such a case, the ad-Controller may select the truck proposal as "better" since it presents a lower risk of damage or injury to human life due to the significant mass and power of the truck, whereas the alternative, the lightweight vehicle offers a much lower chance to ensure a complete stop of both vehicles (post impact) without increasing the risk of crashing into others etc. Thus, in embodiments, the decision at block 330 involves an estimation of internal risk assessment and the various proposals, looking for one that offers minimal impact/damage, etc.

From block 330, process 300 may proceed to block 340, where the vehicle experiencing the emergency condition may receive confirmation from the responding vehicles that one, or many, of them will implement the course of remedial action. From block 340, process 300 may proceed to block 350, where the ad-Controller may co-ordinate the collective response actions. In embodiments, this may include continued communications between the various responders and the vehicle undergoing the emergency, who acts as the coordinator of the response action. Finally, from block 350, process 300 may proceed to block 360, where the vehicle undergoing the emergency may notify all responders that the emergency condition has ended (due to a successful response action), so that they may return to their normal operational mode. At 360, process 300 may terminate.

Figure 4:
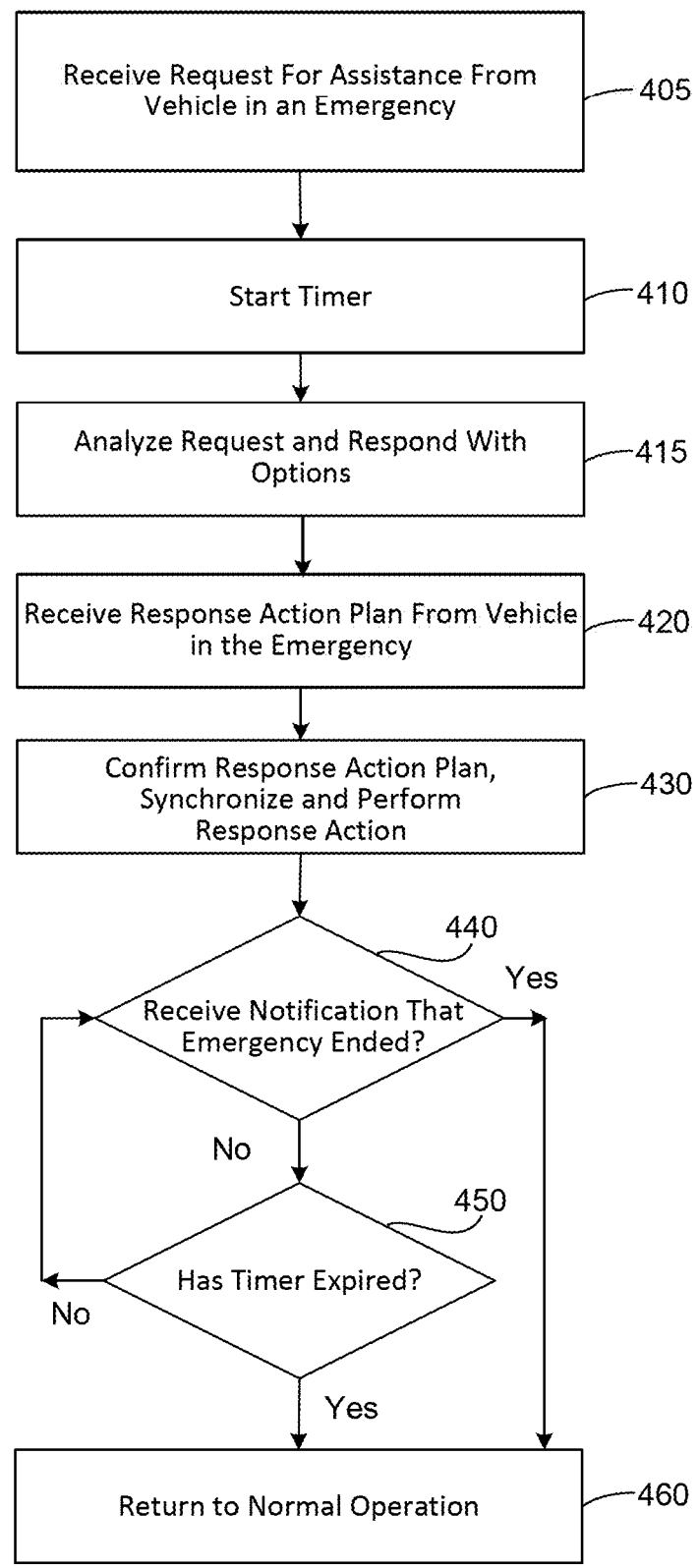
FIG. 4 illustrates an overview of the operational flow of a process for receiving a request for assistance from another CA/AD vehicle and responding to it in accordance with various embodiments.

Referring now to FIG. 4, an overview of the operational flow of a process for receiving a request for assistance from another CA/AD vehicle, and responding to it, in accordance with various embodiments, is presented. Process 400 may be performed by apparatus such as apparatus 251, 251A and 251B as shown in FIG. 2, according to various embodiments. Process 400 may include blocks 410 through 460. In alternate embodiments, process 400 may have more or less operations, and some of the operations may be performed in different order. For ease of illustration, the responding vehicle may be referred to herein as an "ad-Responder."

Process 400 may begin at block 405, where an example apparatus may receive a request for assistance from a vehicle undergoing an emergency condition. This may occur when, for example, an apparatus 251 of FIG. 2 provided in the ad-Responder receives, through vehicle communication facilities 275, an AvREQ 230 from a vehicle needing assistance, as described above. From block 405, process 400 may proceed to block 410, where the ad-Responder may initiate a timer for its involvement in the emergency response. This is to insure that the ad-Responder may return to normal operation if, for some reason, communications from the vehicle in the emergency condition are not received advising that the emergency has ended, and that the ad-Responder's involvement is no longer required. Thus, the timer prevents the ad-Responder being in a state of limbo. The timer may be, in embodiments, timer 247 of FIG. 2B.

From block 410, process 400 may proceed to block 415, where the ad-Responder may analyze the received request and respond with options. For example, in embodiments, the ad-Responder may consider the mass and type of the vehicle in the emergency condition, the number of passengers in each vehicle, its own mechanical capabilities, such as its weight, speed and power, the value of its own cargo and possible impact, its own current task or mission in comparison with the degree of the emergency, any legal aspects, such as, for example, if it is allowed to provide the required type of emergency assistance, or whether if it does would it be insured as to damage, etc.

In embodiments, based on such external and internal analyses, the ad-Responder may decide if and how to help.

For example, assuming the ad-Responder has no passengers, no valuable cargo, and is not then acting on a critical mission, there is a high probability that the ad-Responder may help. Thus, in embodiments, it may respond at block 415 as follows: "I am 100 feet ahead of you. I can perform a maneuver blocking you from a front side, and, following the impact, use my braking system to slowdown both our cars. Please acknowledge."

From block 415, process 400 may proceed to block 420, where the ad-Responder may receive a response action plan from the vehicle in the emergency. In embodiments, the action plan may, or may not, be one that the ad-Responder, or another ad-Responder, has proposed, as described above. From block 420, process 400 may proceed to block 430, where the ad-Responder may confirm the response action plan, synchronize its actions with the vehicle in the emergency situation as well as with any other ad-Responders, and perform the response action under the guidance of the vehicle in emergency.

In embodiments, prior to confirmation, the ad-Responder may verify that there is time to execute the response action, and that it can perform its role in the responsive action. If so, and ad-Responder confirms, it may then synchronize its role (car speed, engine power, distance and angle of attack/contact/approach) with the vehicle in the emergency condition. Similarly, if there are more ad-Responders involved, then each of them may synchronize its actions with those of the other ad-Responders. For example, if the emergency condition involves loss of braking ability, one ad-Responder may perform the maneuver of FIG. 1C, or two ad-Responders may perform the maneuver of FIG. 1D, jumping the emergency vehicle between their two vehicles by synchronizing their position, speed, contact angle, pushing vector and moment.

From block 430, process 400 may proceed to query block 440, where the ad-Responder may determine whether it has received notification from the vehicle in the emergency condition that the emergency condition has ended. If "Yes", at query block 440, then process 400 may proceed to block 460, where it may return to normal operation. Process 400 may then end at block 460.

However, if the response is "No", at query block 440, then process 400 may proceed to query block 450, where it may be determined if the timer set at block 410 has expired. The use of the timer, as noted above, allows the ad-Responder to return to a normal operation mode, even if no further updates are received from the vehicle in the emergency situation. If "Yes", at query block 450, then process 400 may proceed to block 460, where it may return to normal operation. Process 400 may then end at block 460. However, if the response is "No", at query block 450, then process 400 may return to query block 440, and process flow may essentially loop through blocks 440 and 450 until an event that terminates the ad-Responder's emergency response mode occurs.

Figure 5:
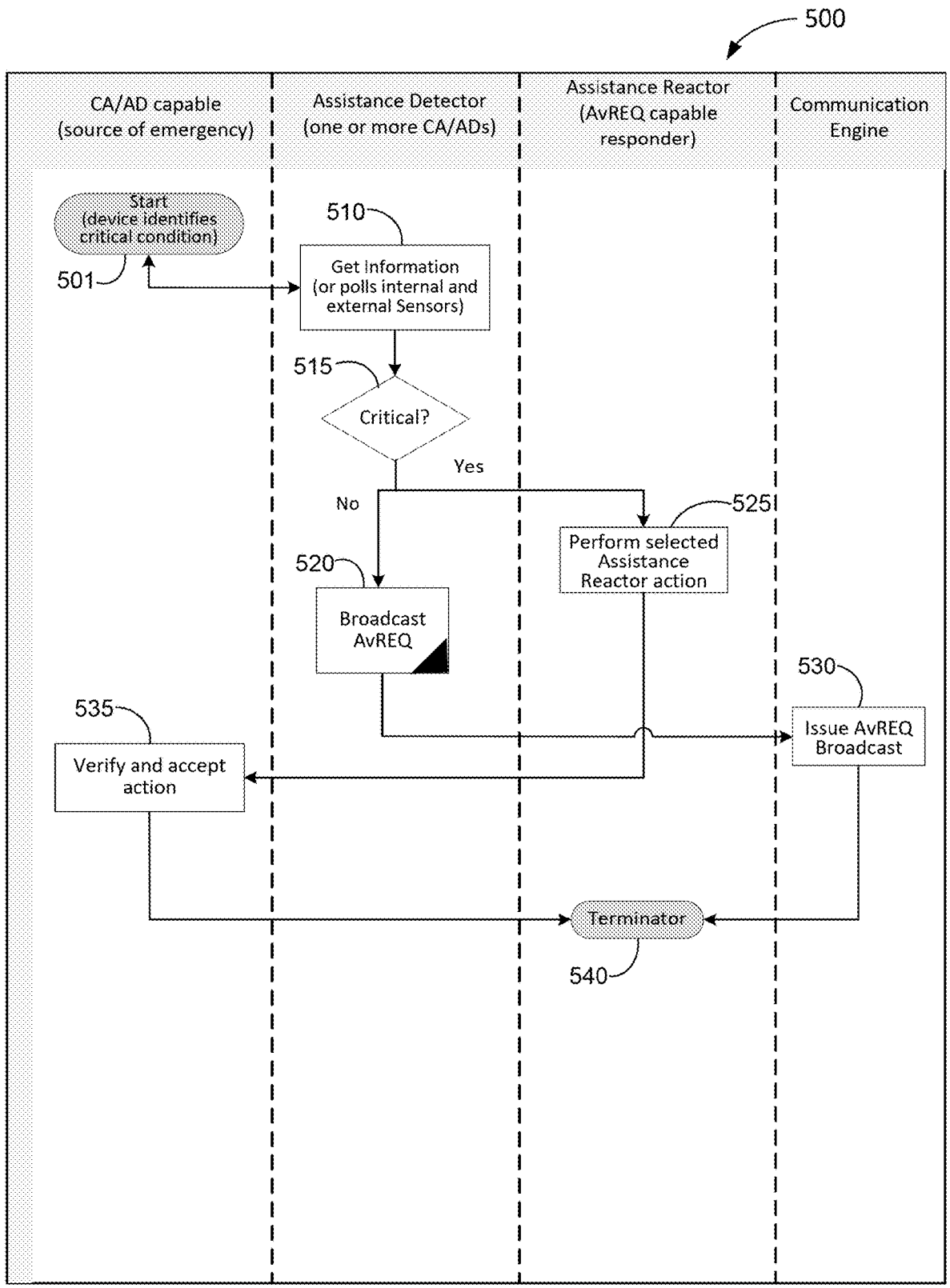
FIG. 5 illustrates an overview of the operational flow of a process for detecting an emergency condition in an CA/AD vehicle and responding to it in another CA/AD vehicle in accordance with various embodiments.

Referring now to FIG. 5, FIG. 5 illustrates an overview of the operational flow of an alternate process for detecting an emergency condition in an CA/AD vehicle and responding to it by another CA/AD vehicle in accordance with various embodiments. FIG. 5 describes a process 500 from the point of view of both the vehicle needing assistance, to illustrate their mutual interaction, and where the responding vehicles determine and implement a response. Process 500 may include blocks 501 through 540. In alternate embodiments, process 500 may have more or less operations, and some of the operations may be performed in different order.

With reference to FIG. 5, process 500 may begin at block 501, where an example apparatus provided in a first CA/AD vehicle may detect a critical emergency condition. From block 501, process 500 may proceed to block 510, where one or more responding CA/AD vehicles may obtain information as to whether they can assist the first CA/AD vehicle. In embodiments, this information may be based, at least in part, on polling internal and external sensors. It is here noted that the time that polling requires affects a "minimum response resolution time" of the responding vehicle.

From block 510, process 500 may proceed to block 515, where the one or more responding CA/AD vehicles may determine, based on the information they have, whether the first vehicle's condition is critical. If Yes at 515, then process 500 may proceed to block 525, where the one or more responding CA/AD vehicles may perform a selected assistance action. In embodiments, this may be a quick response, when there is no time to co-ordinate with several responding vehicles. It is noted that in the embodiment of FIG. 5, it is the responding vehicle(s) that selects the responsive action. The responding vehicles, in this process, are logically divided into an "assistance detector" module, and an "assistance reactor" module, although physically they may be implemented on one board, or even one processor, for example. From block 525, process 500 may proceed to block 535, where the first vehicle may verify and accept the responsive action, and from block 535, process 500 may proceed to block 540, where process 500 may terminate.

On the other hand, if No at 515, then process 500 may proceed to block 520, where the one or more responding CA/AD vehicles may decide to re-broadcast the first vehicle's AvREQ, and then process 500 may proceed to block 530, where a communication engine coupled to the assistance detector of a responding vehicle may re-broadcast the AvREQ, with labeling a hop increment (using this responder vehicle's U-ID), hoping to obtain more possible responses, from additional responders. It is here noted that in some instances the responding vehicle may decide not to rebroadcast the AvREQ, such as, for example, where the responding vehicle is aware that there are no relevant smart and mobile IoT/systems in the vicinity. From block 530, process 500 may proceed to block 540, where process 500 may terminate.

Figure 6:
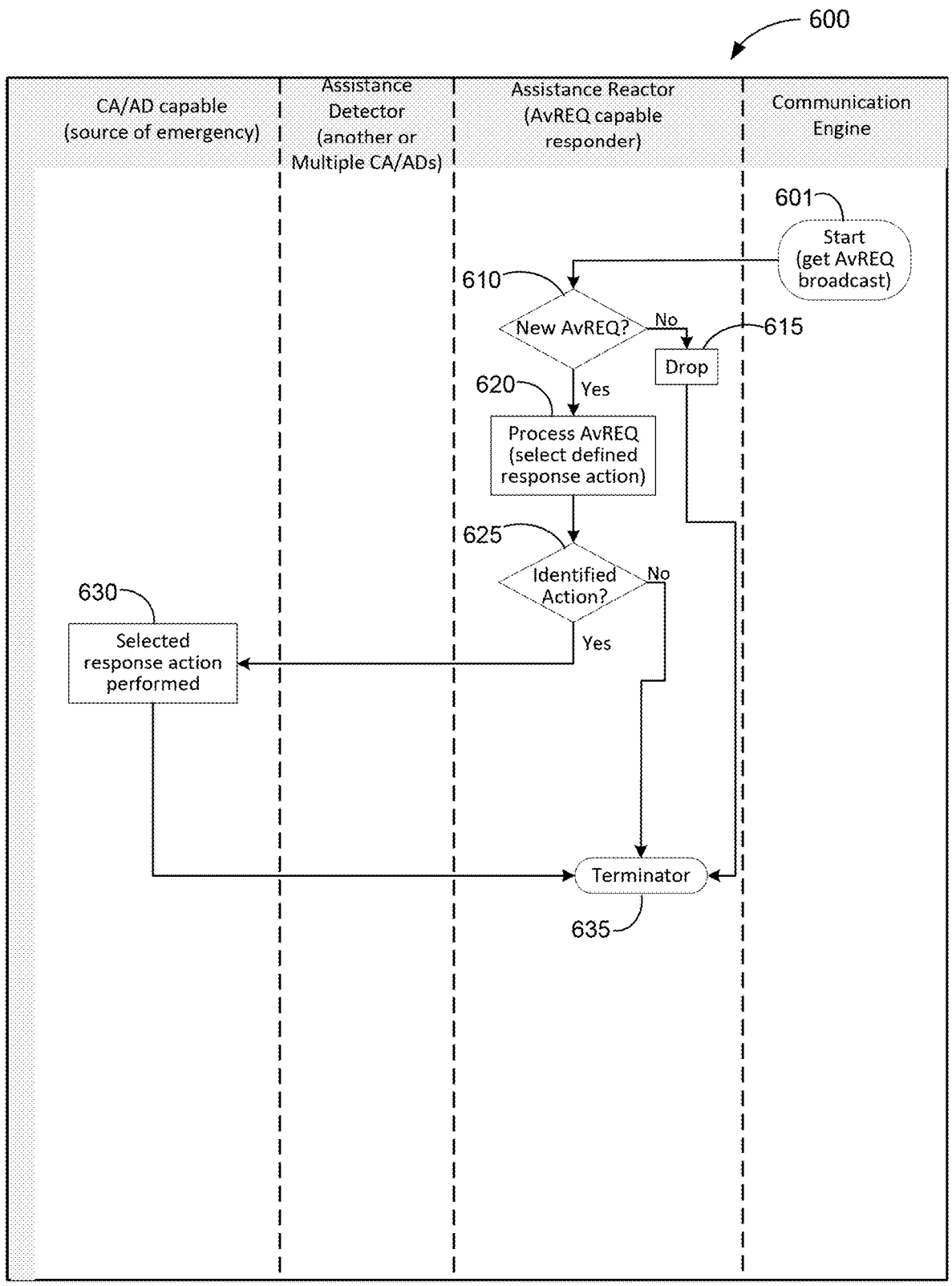
FIG. 6 illustrates an alternate overview of the operational flow of a process for receiving a request for assistance from another CA/AD vehicle and responding to it in accordance with various embodiments.

Referring now to FIG. 6, FIG. 6 illustrates an overview of the operational flow of an alternate process for receiving a request for assistance from another CA/AD vehicle and responding to it in accordance with various embodiments. FIG. 6 describes a process 600 from the point of view of both the vehicle needing assistance, to illustrate their mutual interaction, and where the responding vehicles determine and implement a response. Process 600 may include blocks 601 through 635. In alternate embodiments, process 600 may have more or less operations, and some of the operations may be performed in different order.

With reference to FIG. 6, process 600 may begin at block 601, where a communications engine provided in a responding CA/AD vehicle may receive a AvREQ broadcast from a second vehicle experiencing an emergency condition. From block 601, process 600 may proceed to query block 610, where an assistance reactor provided in the responding CA/AD vehicle may determine if the received AvREQ is a new one. If No at block 610, then process 600 may proceed to block 615, where the AvREQ may be dropped, and then proceed to block 635, where process 600 may terminate. If, however, the determination is Yes at query block 610, then process 600 may proceed to block 620 where the received AvREQ may be processed by the assistance reactor provided in the responding vehicle. In embodiments, this processing may include selection of a defined response action to the AvREQ, if one is available.

From block 620, process 600 may proceed to query block 625, where it may be determined whether a viable response action has been identified. If No at query block 625, then process 600 may proceed to block 635, where process 600 may terminate. However, if Yes at query block 625, then process 600 may proceed to block 630, where the identified responsive action may be performed on, to or with the second vehicle. Finally, once that identified action has been completed, from block 630 process 600 may proceed to block 635, where process 600 may terminate.

Figure 7:
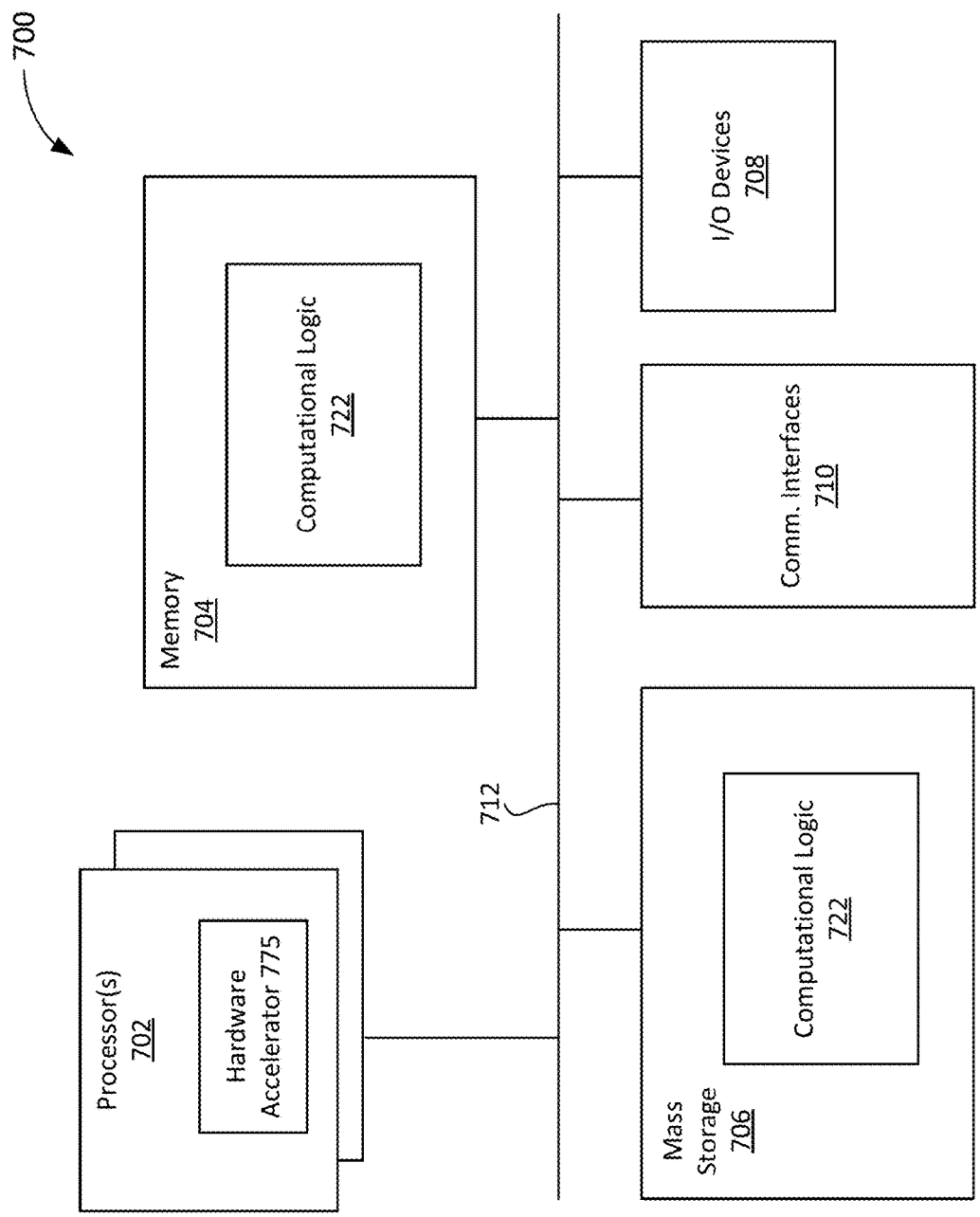
FIG. 7 illustrates a block diagram of a computer device suitable for practicing the present disclosure, in accordance with various embodiments.

Referring now to FIG. 7 wherein a block diagram of a computer device suitable for practicing the present disclosure, in accordance with various embodiments, is illustrated. As shown, computer device 700 may include one or more processors 702, memory controller 703, and system memory 704. Each processor 702 may include one or more processor cores, and hardware accelerator 705. An example of hardware accelerator 705 may include, but is not limited to, programmed field programmable gate arrays (FPGA). In embodiments, processor 702 may also include a memory controller (not shown). In embodiments, system memory 704 may include any known volatile or non-volatile memory.

Additionally, computer device 700 may include mass storage device(s) 706 (such as solid state drives), input/output device interface 708 (to interface with various input/output devices, such as, mouse, cursor control, display device (including touch sensitive screen), and so forth) and communication interfaces 710 (such as network interface cards, modems and so forth). In embodiments, communication interfaces 710 may support wired or wireless communication, including near field communication. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the executable code of the programming instructions of an operating system, one or more applications, and/or various software implemented components of ad-Controller 215, or of ad-Controller 265, collectively referred to as computing logic 722. The programming instructions implementing computing logic 722 may comprise assembler instructions supported by processor(s) 702 or high-level languages, such as, for example, C, that can be compiled into such instructions. In embodiments, some of computing logic may be implemented in hardware accelerator 705. In embodiments, part of computational logic 722, e.g., a portion of the computational logic 722 associated with the runtime environment of the compiler may be implemented in hardware accelerator 705.

The permanent copy of the executable code of the programming instructions or the bit streams for configuring hardware accelerator 705 may be placed into permanent mass storage device(s) 706 and/or hardware accelerator 705 in the factory, or in the field, through, for example, a distribution medium (not shown), such as a compact disc (CD), or through communication interface 710 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 710-712 may vary, depending on the intended use of example computer device 700, e.g., whether example computer device 700 is a smartphone, tablet, ultrabook, a laptop, a server, a set-top box, a game console, a camera, and so forth. The constitutions of these elements 710-712 are otherwise known, and accordingly will not be further described.

Figure 8:
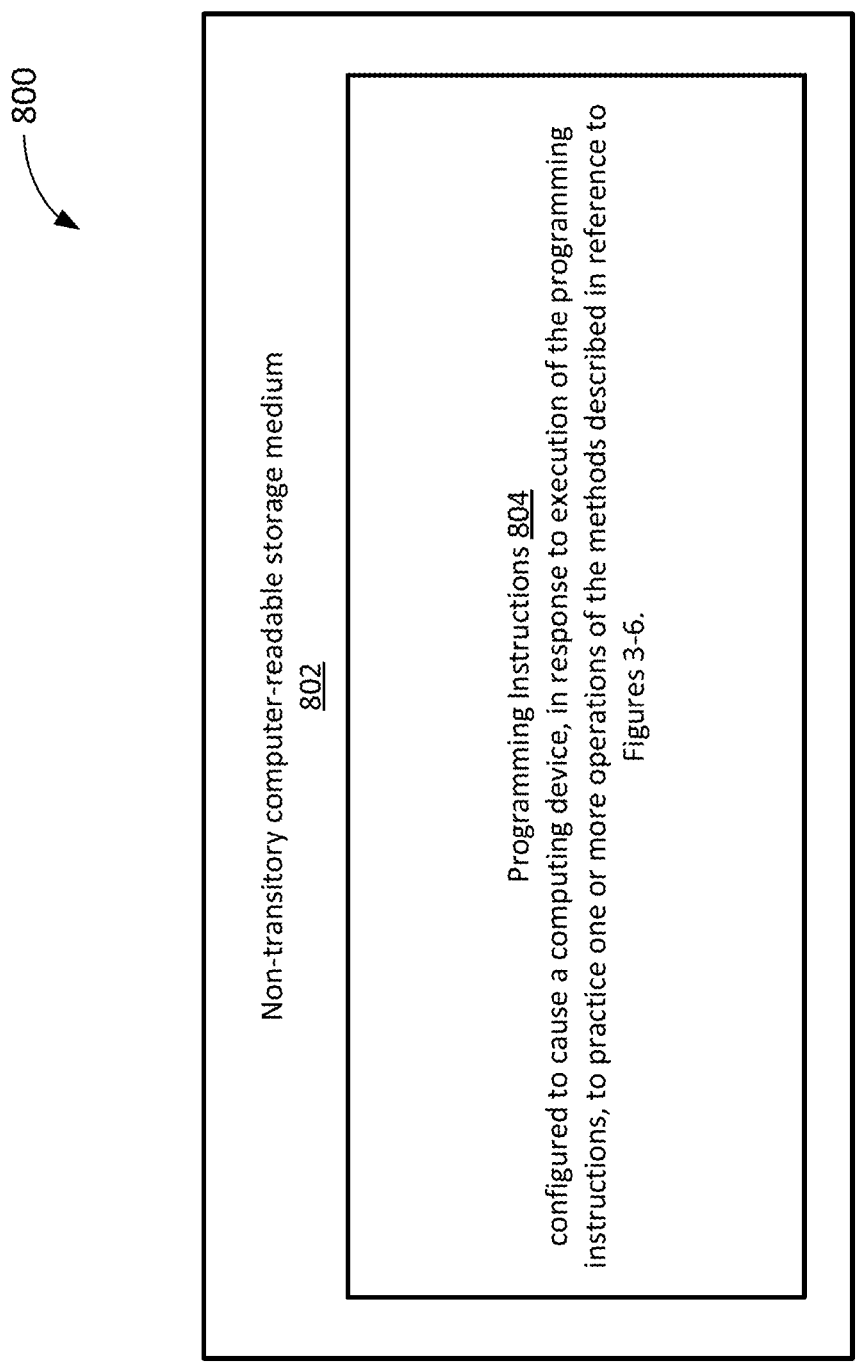
FIG. 8 illustrates an example computer-readable storage medium having instructions configured to practice aspects of the processes of FIGS. 3-6, in accordance with various embodiments.

FIG. 8 illustrates an example computer-readable storage medium having instructions configured to implement all (or portion of) software implementations of Vehicle Main Controller 210, ad-Controller 215, Vehicle Main Controller 260, ad-Controller 265, and/or practice (aspects of) processes 300 of FIG. 3, 400 of FIG. 4, 500 of FIG. 5 and 600 of FIG. 6, earlier described, in accordance with various embodiments. As illustrated, computer-readable storage medium 802 may include the executable code of a number of programming instructions or bit streams 804. Executable code of programming instructions (or bit streams) 804 may be configured to enable a device, e.g., computer device 700, in response to execution of the executable code/programming instructions (or operation of an encoded hardware accelerator 775), to perform (aspects of) process 300 of FIG. 3, process 400 of FIG. 4, process 500 of FIG. 5, and/or process 600 of FIG. 6. In alternate embodiments, executable code/programming instructions/bit streams 804 may be disposed on multiple non-transitory computer-readable storage medium 802 instead. In embodiments, computer-readable storage medium 802 may be non-transitory. In still other embodiments, executable code/programming instructions 804 may be encoded in transitory computer readable medium, such as signals.

Referring back to FIG. 7, for one embodiment, at least one of processors 702 may be packaged together with a computer-readable storage medium having some or all of computing logic 722 (in lieu of storing in system memory 704 and/or mass storage device 706) configured to practice all or selected ones of the operations earlier described with reference to FIGS. 3-6. For one embodiment, at least one of processors 702 may be packaged together with a computer-readable storage medium having some or all of computing logic 722 to form a System in Package (SiP). For one embodiment, at least one of processors 702 may be integrated on the same die with a computer-readable storage medium having some or all of computing logic 722. For one embodiment, at least one of processors 702 may be packaged together with a computer-readable storage medium having some or all of computing logic 722 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 may include an apparatus for safety collaboration in autonomous or semi-autonomous vehicles, comprising: an input interface to obtain sensor data from one or more sensors of a computer-assisted or autonomous driving (CA/AD) vehicle; an output interface; and an analyzer coupled to the input and output interfaces to process the sensor data to identify an emergency condition of the CA/AD vehicle, and in response to the identified emergency condition, cause a communication interface of the CA/AD vehicle, via the output interface, to broadcast a request for assistance to be received by one or more nearby CA/AD vehicles; wherein the apparatus is disposed in the CA/AD vehicle.

Example 2 may include the apparatus of claim 1, and/or any other example herein, wherein the input interface is to further receive one or more responses to the request for assistance provided by other nearby vehicles; and the analyzer, in response to the one or more responses, is to formulate an emergency response plan, and send the emergency response plan, via the output interface, to the other nearby vehicles that responded.

Example 3 may include the apparatus of claim 2, and/or any other example herein, wherein each of the one or more responses includes one or more of: size of the responding vehicle, mass of the responding vehicle, speed and location of the responding vehicle, any constraints on the ability of the responding vehicle to assist, passengers in the responding vehicle, or any special resources of the responding vehicle.

Example 4 may include the apparatus of claim 2, and/or any other example herein, wherein the input interface is further to receive a confirmation signal from the one or more responding vehicles, and upon its receipt, the analyzer further to monitor execution of the emergency response plan.

Example 5 may include the apparatus of example 4, and/or any other example herein, wherein the analyzer, upon completion of execution of the emergency response plan, is further to send a signal indicating that the emergency condition has been resolved, via the output interface, to the one or more responding vehicles.

Example 6 may include the apparatus of any one of examples 1-5, and/or any other example herein, wherein the request for assistance includes at least one of an emergency type and a risk assessment.

Example 7 may include the apparatus of example 6, and/or any other example herein, wherein the emergency type is at least one of: engine fire, loss of brakes, loss of steering, hijacked or unauthorized car control, dangerous fuel leakage or battery flammable alarm, loss of sensors critical to guidance, lack of fuel, or unstable air pressure in tires.

Example 8 may include the apparatus of any one of examples 1-5, and/or any other example herein, wherein the request for assistance includes a location, provided in at least one of GPS/A-GPS coordinates, or a field encoding location metrics.

Example 9 may include the apparatus of any one of examples 1-5, and/or any other example herein, wherein the apparatus comprises a distress controller having the input interface, the output interface and the analyzer.

Example 10 may include the apparatus of example 9, and/or any other example herein, further comprising: a main vehicle controller, coupled to the distress controller and to the one or more sensors of the CA/AD vehicle; wherein the distress controller obtains the sensor data in an alarm signal received from the main vehicle controller.

Example 11 may include the apparatus of example 10, and/or any other example herein, further comprising the one or more sensors of the CA/AD vehicle.

Example 12 may include the apparatus of example 10, and/or any other example herein, wherein the main vehicle controller polls the one or more sensors at one of pre-defined intervals or continuously, and generates the alarm signal in response to pre-defined sensor values.

Example 13 may include the apparatus of example 10, and/or any other example herein, wherein the distress controller is integrated into the main vehicle controller.

Example 14 may include the apparatus of any one of examples 1-5, and/or any other example herein, wherein the input interface obtains the sensor data at one of pre-defined intervals or continuously.

Example 15 may include the apparatus of any one of examples 1-5, and/or any other example herein, wherein the one or more sensors of the CA/AD vehicle include one or more of a speed sensor, a brake failure sensor, a flat tire sensor, a tire blowout sensor, a collision sensor or a steering failure sensor.

Example 16 may include the apparatus of example 2, and/or any other example herein, wherein the emergency response plan includes at least one of a direct block or a jump and stop.

Example 17 may include one or more non-transitory computer-readable storage media comprising a plurality of instructions that in response to being executed cause a controller disposed in a CA/AD vehicle, to: obtain sensor data from one or more sensors of a computer-assisted or autonomous driving (CA/AD) vehicle; process the sensor data to identify an emergency condition of the CA/AD vehicle; in response to the identified emergency condition, cause a communication interface of the CA/AD vehicle to broadcast a request for assistance to be received by one or more nearby CA/AD vehicles; wherein the request for assistance includes at least one of an emergency type and a risk assessment.

Example 18 may include the one or more non-transitory computer-readable storage media of example 17, and/or any other example herein, further comprising instructions that in response to being executed cause the controller to: receive one or more responses to the distress signal from nearby CA/AD vehicles; and in response to the one or more responses: formulate an emergency response plan, and send the emergency response plan to the nearby CA/AD vehicles.

Example 19 may include the one or more non-transitory computer-readable storage media of example 18, and/or any other example herein, wherein each of the one or more responses includes one or more of: size of the responding vehicle, mass of the responding vehicle, speed and location of the responding vehicle, any constraints on the ability of the responding vehicle to assist passengers in the responding vehicle, or any special resources of the responding vehicle.

Example 20 may include the one or more non-transitory computer-readable storage media of example 18, and/or any other example herein, further comprising instructions that in response to being executed cause the controller to: receive a confirmation signal from the one or more responding vehicles, and upon receipt of the confirmation signal, monitor execution of the emergency response plan.

Example 21 may include the one or more non-transitory computer-readable storage media of example 17, and/or any other example herein, further comprising instructions that in response to being executed cause the controller to: upon completion of execution of the emergency response plan, send to the one or more responding vehicles a signal indicating that the emergency condition has been resolved.

Example 22 may include the one or more non-transitory computer-readable storage media of any one of examples 17-21, and/or any other example herein, wherein the request for assistance includes at least one of an emergency type and a risk assessment.

Example 23 may include the one or more non-transitory computer-readable storage media of example 22, and/or any other example herein, wherein the emergency type is at least one of: engine fire, loss of brakes, loss of steering, hijacked or unauthorized car control, dangerous fuel leakage or battery flammable alarm, loss of sensors critical to guidance, lack of fuel, or unstable air pressure in tires.

Example 24 may include the one or more non-transitory computer-readable storage media of examples 17-21, and/or any other example herein, wherein the request for assistance includes a location, provided in at least one of GPS/A-GPS coordinates, or a field encoding location metrics.

Example 25 may include the one or more non-transitory computer-readable storage media of example 17, and/or any other example herein, wherein the emergency type of the request for assistance includes loss of breaks, and the emergency response plan includes a jump and stop.

Example 26 may include the one or more non-transitory computer-readable storage media of example 17, and/or any other example herein, wherein the controller is a distress controller of a CA/AD vehicle.

Example 27 may include the one or more non-transitory computer-readable storage media of example 26, and/or any other example herein, wherein the distress controller is part of an on-board system of the CA/AD vehicle Example 28 may include the one or more non-transitory computer-readable storage media of example 17, and/or any other example herein, wherein the request for assistance further includes the mass, velocity and position of the CA/AD vehicle.

Example 29 may include the one or more non-transitory computer-readable storage media of example 27, and/or any other example herein, further comprising instructions that in response to being executed cause the controller to: poll the one or more sensors at one of pre-defined intervals or continuously, and generate the alarm signal in response to pre-defined sensor values.

Example 30 may include the one or more non-transitory computer-readable storage media of any one of examples 17-21, and/or any other example herein, further comprising instructions that in response to being executed cause the controller to obtain the sensor data from the one or more sensors at one of pre-defined intervals or continuously.

Example 31 may include the one or more non-transitory computer-readable storage media of any one of examples 17-21, and/or any other example herein, wherein the one or more sensors of the CA/AD vehicle include one or more of a speed sensor, a brake failure sensor, a flat tire sensor, a tire blowout sensor, a collision sensor or a steering failure sensor.

Example 32 may include a method of collaboratively responding to emergency conditions in computer-assisted or autonomous driving (CA/AD) vehicles, comprising: obtaining, by an apparatus on board a CA/AD vehicle, sensor data from one or more sensors of the CA/AD vehicle; processing, by the apparatus, the sensor data to identify an emergency condition of the CA/AD vehicle; and in response to the identified emergency condition, causing, by the apparatus, broadcast of a request for assistance to be received by one or more nearby CA/AD vehicles; wherein the request for assistance includes at least one of an emergency type and a risk assessment.

Example 33 may include the method of example 32, and/or any other example herein, further comprising: receiving, by the apparatus, one or more responses to the request for assistance from nearby CA/AD vehicles; and in response to the one or more responses:
formulating, by the apparatus, an emergency response plan, and sending, by the apparatus, the emergency response plan to the nearby CA/AD vehicles that responded.

Example 34 may include the method of example 32, and/or any other example herein, wherein each of the one or more responses includes one or more of: size of the responding vehicle, mass of the responding vehicle, speed and location of the responding vehicle, any constraints on the ability of the responding vehicle to assist, passengers in the responding vehicle, or any special resources of the responding vehicle.

Example 35 may include the method of example 32, and/or any other example herein, further comprising receiving, by the apparatus, a confirmation signal from the one or more responding vehicles, and upon receipt of the confirmation signal, monitoring execution of the emergency response plan.

Example 36 may include the method of example 35, and/or any other example herein, further comprising, upon completion of execution of the emergency response plan, causing, by the apparatus, sending to the one or more responding vehicles a signal indicating that the emergency condition has been resolved and that they may return to normal operation.

Example 37 may include the method of example 32, and/or any other example herein, wherein the request for assistance includes at least one of an emergency type and a risk assessment.

Example 38 may include the method of example 37, and/or any other example herein, wherein the emergency type is at least one of: engine fire, loss of brakes, loss of steering, hijacked or unauthorized car control, dangerous fuel leakage or battery flammable alarm, loss of sensors critical to guidance, lack of fuel, or unstable air pressure in tires.

Example 39 may include the method of example 32, and/or any other example herein, wherein the request for assistance includes a location, provided in at least one of GPS/A-GPS coordinates, or a field encoding location metrics.

Example 40.0 may include the method of example 32, and/or any other example herein, wherein obtaining the sensor data includes obtaining the sensor data at one of pre-defined intervals or continuously.

Example 40.2 may include the method of example 32, and/or any other example herein, wherein the one or more sensors of the CA/AD vehicle include one or more of a speed sensor, a brake failure sensor, a flat tire sensor, a tire blowout sensor, a collision sensor or a steering failure sensor.

Example 40.3 may include the method of example 33, and/or any other example herein, wherein the emergency response plan includes at least one of a direct block or a jump and stop.

Example 41 may include one or more non-transitory computer-readable storage media comprising a plurality of instructions that in response to being executed cause a controller disposed in a CA/AD vehicle, to perform the methods of any one of examples 32-40.3.

Example 42 may include an apparatus for computing, comprising: means for obtaining sensor data from one or more sensors of a computer-assisted or autonomous driving (CA/AD) vehicle; means for processing the sensor data to identify an emergency condition of the CA/AD vehicle; and, means for causing a communication interface of the CA/AD vehicle to broadcast a request for assistance to be received by one or more nearby CA/AD vehicles, in response to the identified emergency condition, wherein the request for assistance includes at least one of an emergency type and a risk assessment.

Example 43 may include the apparatus for computing of example 42, and/or any other example herein, further comprising: means for receiving one or more responses to the distress signal from nearby CA/AD vehicles; and means for, in response to the one or more responses: formulating an emergency response plan, and sending the emergency response plan to the nearby CA/AD vehicles.

Example 44 may include the apparatus for computing of example 43, and/or any other example herein, wherein each of the one or more responses includes one or more of: size of the responding vehicle, mass of the responding vehicle, speed and location of the responding vehicle, any constraints on the ability of the responding vehicle to assist, passengers in the responding vehicle, or any special resources of the responding vehicle.

Example 45 may include the apparatus for computing of example 43, and/or any other example herein, further comprising: means for receiving a confirmation signal from the one or more responding vehicles, and, means for monitoring execution of the emergency response plan upon receiving of the confirmation signal.

Example 46 may include the apparatus for computing of example 42, and/or any other example herein, further comprising: means for sending to the one or more responding vehicles, upon completion of execution of the emergency response plan, a signal indicating that the emergency condition has been resolved.

Example 47 may include the apparatus for computing of any one of examples 42-46, and/or any other example herein, wherein the request for assistance includes at least one of an emergency type and a risk assessment.

Example 48 may include the apparatus for computing of example 22, and/or any other example herein, wherein the emergency type is at least one of: engine fire, loss of brakes, loss of steering, hijacked or unauthorized car control, dangerous fuel leakage or battery flammable alarm, loss of sensors critical to guidance, lack of fuel, or unstable air pressure in tires.

Example 49 may include the apparatus for computing of any one of examples 42-46, and/or any other example herein, wherein the request for assistance includes a location, provided in at least one of GPS/A-GPS coordinates, or a field encoding location metrics.

Example 50 may include the apparatus for computing of example 42, and/or any other example herein, wherein the emergency type of the request for assistance includes loss of breaks, and the emergency response plan includes a jump and stop.

Example 51 may include the apparatus for computing of example 42, and/or any other example herein, wherein the request for assistance further includes the mass, velocity and position of the CA/AD vehicle.

Example 52 may include the apparatus for computing of example 42, and/or any other example herein, the means for obtaining sensor data further comprising means for polling the one or more sensors at one of pre-defined intervals or continuously.

Example 53 may include the apparatus for computing of example 52, and/or any other example herein, the means for processing the sensor data further comprising means for generating an alarm signal in response to pre-defined sensor values.

Example 54 may include the apparatus for computing of any one of examples 42-53, and/or any other example herein, wherein the one or more sensors of the CA/AD vehicle include one or more of a speed sensor, a brake failure sensor, a flat tire sensor, a tire blowout sensor, a collision sensor or a steering failure sensor.

Example 55 may include a method of collaboratively responding to emergency conditions in computer-assisted or autonomous driving (CA/AD) vehicles, comprising: receiving, by an apparatus on board a CA/AD vehicle, a request for assistance issued by a nearby CA/AD vehicle indicating an emergency condition of the CA/AD vehicle, the request for assistance including at least one of an emergency type and a risk assessment; starting a timer; processing, by the apparatus, the request for assistance to identify options for responding to the emergency condition of the CA/AD vehicle; and sending a response to the nearby CA/AD vehicle indicating an ability to assist with a response to the emergency condition, and one or more identified options for response.

Example 56 may include the method of example 55, and/or any other example herein, further comprising receiving, by the apparatus on board the CA/AD vehicle, from the nearby CA/AD vehicle an action plan responsive to the emergency condition.

Example 57 may include the method of example 56, and/or any other example herein, further comprising: sending, by the apparatus, a response to the nearby CA/AD vehicle confirming the action plan; and performing, by the apparatus, at least in part, the action plan.

Example 58 may include the method of example 57, and/or any other example herein, further comprising determining, by the apparatus, if a notification has been received from the nearby CA/AD vehicle indicating that the emergency condition has ended, and in response to a determination that the emergency condition has ended, returning to normal operation.

Example 59 may include the method of example 57, and/or any other example herein, further comprising determining, by the apparatus, if the timer has expired, and in response to a determination that the timer has expired, returning to normal operation.

Example 60 may include an apparatus for computing, comprising: means for receiving, on board a CA/AD vehicle, a request for assistance issued by a nearby CA/AD vehicle indicating an emergency condition of the CA/AD vehicle, the request for assistance including at least one of an emergency type and a risk assessment; means for starting a timer; means for processing the request for assistance to identify options for responding to the emergency condition of the CA/AD vehicle; and means for sending a response to the nearby CA/AD vehicle indicating an ability to assist with a response to the emergency condition, and one or more identified options for response.

Example 61 may include the apparatus for computing of example 60, and/or any other example herein, the means for receiving including means for receiving an action plan responsive to the emergency condition from the nearby CA/AD vehicle.

Example 62 may include the apparatus for computing of example 61, and/or any other example herein, the means for sending including means for a response to the nearby CA/AD vehicle confirming the action plan; and further comprising means for performing, at least in part, the action plan.

Example 63 may include the apparatus for computing of example 62, and/or any other example herein, further comprising means for determining if a notification has been received from the nearby CA/AD vehicle indicating that the emergency condition has ended, and means for causing the CA/AD vehicle to return to normal operation, in response to a determination that the emergency condition has ended.

Example 64 may include the apparatus for computing of example 62, and/or any other example herein, further comprising means for determining if the timer has expired, and means for causing the CA/AD vehicle to return to normal operation, in response to a determination that the timer has expired.

What is claimed is:

1. A cooperative driving automation (CDA) device in a CDA-equipped vehicle, the CDA device comprising:
    communication circuitry to communicate a sequence of collaborative messages with one or more other CDA devices, the sequence of collaborative messages to influence local planning of a future action; and
    processor circuitry communicatively coupled with the communication circuitry, the processor circuitry to:
        determine a proposed plan to perform the future action;
        generate a first collaborative message of the sequence of collaborative messages indicating the proposed plan; and
        execute at least one maneuver of the proposed plan when respective second collaborative messages from the sequence of collaborative messages indicate acceptance of the proposed plan by the one or more other CDA devices.

2. The CDA device of claim 1, wherein the processor circuitry is further to:
    not execute the at least one maneuver of the proposed plan when at least one of the respective second collaborative messages indicates rejection of the proposed plan by at least one of the one or more other CDA devices.

3. The CDA device of claim 1, wherein the communication circuitry is to communicate via machine-to-machine (M2M) communication.

4. The CDA device of claim 1, wherein the one or more other CDA devices are proximate to the CDA-equipped vehicle or surround the CDA-equipped vehicle.

5. The CDA device of claim 1, wherein the at least one of the respective second collaborative messages includes an alternative proposed plan for performing the future action.

6. The CDA device of claim 1, wherein the plan is based on at least one collaborative message obtained from at least one other CDA device of the one or more other CDA devices.

7. The CDA device of claim 1, wherein the processor circuitry is further to:
    detect an emergency situation; and
    determine the proposed plan in response to detecting the emergency situation.

8. The CDA device of claim 7, further comprising: interface circuitry communicatively coupled with the processor circuitry, wherein the processor circuitry is further to:
    obtain sensor data from one or more sensors disposed in the CDA-equipped vehicle; and
    detect the emergency situation based on the sensor data.

9. The CDA device of claim 1, wherein the proposed plan for performing the future action includes one or more of acceleration, deceleration, and motion control via steering.

10. One or more non-transitory computer readable media (NTCRM) comprising instructions, wherein execution of the instructions by one or more processors of a cooperative driving automation (CDA) device in a CDA-equipped vehicle is to cause the CDA device to:
    determine a proposed plan to perform a future action, the future action including one or more maneuvers to be performed by the CDA-equipped vehicle;
    generate a first collaborative message including the proposed plan;
    cause transmission of a first machine-to-machine (M2M) collaborative message to one or more other CDA devices within a transmission range of the CDA-equipped vehicle;
    receive respective second M2M collaborative messages from the one or more other CDA devices; and
    control one or more components of the CDA-equipped vehicle to execute the one or more maneuvers when the respective second M2M collaborative messages indicate an acceptance of the proposed plan by the one or more other CDA devices.

11. The one or more NTCRM of claim 10, wherein execution of the instructions is to further cause the CDA device to:
    not execute the one or more maneuvers when at least one of the respective second M2M collaborative messages indicates rejection of the proposed plan by at least one of the one or more other CDA devices.

12. The one or more NTCRM of claim 10, wherein at least one of the respective second M2M collaborative messages includes an alternative proposed plan for performing the future action.

13. The one or more NTCRM of claim 10, wherein the one or more other CDA devices are proximate to the CDA-equipped vehicle or surround the CDA-equipped vehicle.

14. The one or more NTCRM of claim 10, wherein the plan is based on at least one M2M collaborative message obtained from at least one other CDA device of the one or more other CDA devices.

15. The one or more NTCRM of claim 10, wherein execution of the instructions is to further cause the CDA device to:
    detect an emergency situation; and
    determine the proposed plan in response to detection of the emergency situation.

16. The one or more NTCRM of claim 15, wherein execution of the instructions is to further cause the CDA device to:
    obtain sensor data from one or more sensors disposed in the CDA-equipped vehicle; and
    detect the emergency situation based on the sensor data.

17. The one or more NTCRM of claim 10, wherein the proposed plan for performing the future action includes one or more of acceleration, deceleration, and motion control via steering.

18. The one or more NTCRM of claim 10, wherein the one or more other CDA devices are disposed in respective other CDA-equipped vehicles.

19. A cooperative driving automation (CDA)-equipped vehicle, comprising:
    one or more sensors to collect sensor data;
    communication circuitry to communicate a sequence of collaborative machine-to-machine (M2M) messages with one or more CDA devices, the sequence of collaborative M2M messages to influence local planning of a future action; and a cooperative automated driving system (C-ADS) communicatively coupled with the one or more sensors and the communication circuitry, the C-ADS to:
   determine a proposed plan to perform the future action;
   generate a first collaborative M2M message of the sequence of collaborative M2M messages indicating the proposed plan; and
   execute at least one maneuver of the proposed plan when respective second collaborative M2M messages of the sequence of collaborative M2M messages indicate acceptance of the proposed plan by the one or more CDA devices.

20. The CDA-equipped vehicle of claim 19, wherein the C-ADS is further to:
   not execute the at least one maneuver of the proposed plan when at least one of the respective second collaborative M2M messages indicates rejection of the proposed plan by at least one of the one or more CDA devices.

21. The CDA-equipped vehicle of claim 19, wherein at least one of the respective second collaborative M2M messages includes an alternative proposed plan for performing the future action.

22. The CDA-equipped vehicle of claim 19, wherein the one or more other CDA devices are proximate to the CDA-equipped vehicle or surround the CDA-equipped vehicle.

23. The CDA-equipped vehicle of claim 19, wherein the plan is based on at least one of the sequence of collaborative M2M messages obtained from at least one CDA device of the one or more CDA devices.

24. The CDA-equipped vehicle of claim 19, wherein the C-ADS is further to:
   detect an emergency situation based on the sensor data obtained from the one or more sensors; and
   determine the proposed plan in response to detecting the emergency situation.

25. The CDA-equipped vehicle of claim 19, wherein the proposed plan for performing the future action includes one or more of acceleration, deceleration, and motion control via steering.

26. A cooperative driving automation (CDA) device in a CDA-equipped vehicle, the CDA device comprising:
   communication circuitry to:
     receive, from another CDA device, a first collaborative message indicating a proposed plan to perform one or more maneuvers of a future action,
     send, to the other CDA device, a second collaborative message; and
   processor circuitry communicatively coupled with the communication circuitry, the processor circuitry to:
     determine whether to accept or reject the proposed plan based on current circumstances of the CDA-equipped vehicle;
     generate the second collaborative message to indicate acceptance or rejection of the proposed plan; and
     execute a maneuver according to the proposed plan when the proposed plan is accepted.

27. The CDA device of claim 26, wherein the processor circuitry is to:
   not execute the maneuver according to the proposed plan when the proposed plan is rejected.

28. The CDA device of claim 26, wherein the communication circuitry is to communicate via machine-to-machine (M2M) communication.

29. The CDA device of claim 26, wherein the one or more other CDA devices are proximate to the CDA-equipped vehicle or surround the CDA-equipped vehicle.

30. The CDA device of claim 26, wherein, when the proposed plan is rejected, the processor circuitry is to: determine an alternative proposed plan for performing the future action, the alternative proposed plan including one or more maneuvers different than the one or more maneuvers of the proposed plan.

31. The CDA device of claim 26, wherein the alternative proposed plan is based on at least one collaborative message obtained from at least one other CDA device different than the other CDA device from which the first collaborative message is received.

32. The CDA device of claim 26, wherein the processor circuitry is further to:
   detect an emergency situation; and
   determine the proposed plan in response to detecting the emergency situation.

33. The CDA device of claim 32, further comprising: interface circuitry communicatively coupled with the processor circuitry, wherein the processor circuitry is further to: obtain sensor data from one or more sensors disposed in the CDA-equipped vehicle; and detect the emergency situation based on the sensor data.

34. The CDA device of claim 26, wherein the proposed plan for performing the future action includes one or more of acceleration, deceleration, and motion control via steering.

* * * * *

UNITED STATES PATENT AND TRADEMARK OFFICE
CERTIFICATE OF CORRECTION

PATENT NO. : 11,580,857 B2
APPLICATION NO. : 17/313920
DATED : February 14, 2023
INVENTOR(S) : Avi Priev It is certified that error appears in the above-identified patent and that said Letters Patent is hereby corrected as shown below:

In the Claims

Column 26
Line 27, Claim 31 "The CDA device of claim 26, wherein…" should read --The CDA device of claim 30, wherein…--

Signed and Sealed this
Twentieth Day of August, 2024

Katherine Kelly Vidal
Director of the United States Patent and Trademark Office